US012380350B2

United States Patent
Nam

(10) Patent No.: US 12,380,350 B2
(45) Date of Patent: Aug. 5, 2025

(54) OPTIMIZING CIRCUIT COMPILER FOR TRAPPED-ION QUANTUM COMPUTERS

(71) Applicant: IONQ, INC., College Park, MD (US)

(72) Inventor: Yunseong Nam, North Bethesda, MD (US)

(73) Assignee: IONQ, INC., College Park, MD (US)

( * ) Notice: Subject to any disclaimer, the term of this patent is extended or adjusted under 35 U.S.C. 154(b) by 913 days.

(21) Appl. No.: 17/490,769

(22) Filed: Sep. 30, 2021

(65) Prior Publication Data

US 2022/0101169 A1 Mar. 31, 2022

Related U.S. Application Data

(60) Provisional application No. 63/108,786, filed on Nov. 2, 2020, provisional application No. 63/086,008, filed on Sep. 30, 2020.

(51) Int. Cl.
G06N 10/00 (2022.01)

(52) U.S. Cl.
CPC ................... G06N 10/00 (2019.01)

(58) Field of Classification Search
CPC ...................................... G06N 10/00
See application file for complete search history.

(56) References Cited

U.S. PATENT DOCUMENTS

| | | | | |
|---|---|---|---|---|
| 2019/0205784 | A1* | 7/2019 | Monroe | G06N 10/40 |
| 2020/0184024 | A1* | 6/2020 | Nam | G06F 30/327 |
| 2020/0218848 | A1* | 7/2020 | Martiel | G06F 30/392 |
| 2020/0219002 | A1* | 7/2020 | Martiel | B82Y 10/00 |
| 2020/0272926 | A1* | 8/2020 | Chaplin | G06F 30/337 |
| 2020/0285985 | A1* | 9/2020 | Javadiabhari | G06N 10/80 |
| 2021/0182096 | A1* | 6/2021 | Walker | G06N 10/70 |
| 2022/0374390 | A1* | 11/2022 | Chong | G06N 10/60 |

OTHER PUBLICATIONS

Sivarajah, Seyon, et al. "t| ket: a retargetable compiler for NISQ devices." Quantum Science and Technology 6.1 (2020): 014003. (Year: 2020).*

(Continued)

*Primary Examiner* — Andrew T Chiusano
(74) *Attorney, Agent, or Firm* — Patterson + Sheridan, LLP

(57) ABSTRACT

A method of performing a computation using a quantum computer includes converting, by a classical computer, a first quantum circuit to a second quantum circuit, wherein the first quantum circuit comprises a conventional gate set and the second quantum circuit comprises a standard trapped-ion gate set, generating a first optimized quantum circuit, which comprises the standard trapped-ion gate set, by adjusting the second quantum circuit, by use of the classical computer, converting, by the classical computer, the first optimized quantum circuit to a third quantum circuit comprising a phase-insensitive trapped-ion gate set, generating a second optimized quantum circuit comprising the phase-insensitive trapped-ion gate set, by adjusting the third quantum circuit, by use of the classical computer, and applying the first and the second optimized quantum circuit on a quantum computer to perform a computation.

20 Claims, 12 Drawing Sheets

(56) References Cited

OTHER PUBLICATIONS

Maslov, Dmitri, and Yunseong Nam. "Use of global interactions in efficient quantum circuit constructions." New Journal of Physics 20.3 (2018): 033018. (Year: 2018).*

Nam, Yunseong, et al. "Automated optimization of large quantum circuits with continuous parameters." npj Quantum Information 4.1 (2018): 23. (Year: 2018).*

Steane, Andrew M., et al. "Pulsed force sequences for fast phase-insensitive quantum gates in trapped ions." New Journal of Physics 16.5 (2014): 053049. (Year: 2014).*

Schäfer, V. M., et al. "Fast quantum logic gates with trapped-ion qubits." Nature 555.7694 (2018): 75-78. (Year: 2018).*

Maslov, Dmitri. "Basic circuit compilation techniques for an ion-trap quantum machine." New Journal of Physics 19.2 (2017): 023035. (Year: 2017).*

P. W. Shor, Polynomial-time algorithms for prime factorization and discrete logarithms on a quantum computer. SIAM Rev. 41, 303-332 (1999).

L. K. Grover, Quantum mechanics helps in searching for a needle in a haystack. Phys. Rev. Lett. 79, 325-328 (1997).

R. P. Feynman, Simulating physics with computers. Int. J. Theor. Phys. 21, 467-488 (1982).

Y. Wang, M. Um, J. Zhang, S. An, M. Lyu, J.-N. Zhang, L.-M. Duan, D. Yum, K. Kim, Single-qubit quantum memory exceeding ten-minute coherence time. Nat. Photonics 11, 646-650 (2017).

T. P. Harty, D. T. C. Allcock, C. J. Ballance, L. Guidoni, H. A. Janacek, N. M. Linke, D. N. Stacey, D. M. Lucas, High-fidelity preparation, gates, memory, and readout of a trapped-ion quantum bit. Phys. Rev. Lett. 113, 220501 (2014).

J. P. Gaebler, T. R. Tan, Y. Lin, Y. Wan, R. Bowler, A. C. Keith, S. Glancy, K. Coakley, E. Knill, D. Leibfried, D. J. Wineland, High-fidelity universal gate set for ion qubits. Phys. Rev. Lett. 117, 060505 (2016).

C. J. Ballance, T. P. Harty, N. M. Linke, M. A. Sepiol, D. M. Lucas, High-fidelity quantum logic gates using trapped-ion hyperfine qubits. Phys. Rev. Lett. 117, 060504 (2016).

N. M. Linke, D. Maslov, M. Roetteler, S. Debnath, C. Figgatt, K. A. Landsman, K. Wright, C. Monroe, Experimental comparison of two quantum computing architectures. Proc. Natl. Acad. Sci. U.S.A. 114, 3305-3310 (2017).

D. Maslov, Y. S. Nam, J. Kim, An outlook for quantum computing, Proc. IEEE, 107, 5-10 (2019).

Y. Nam, D. Maslov, Low cost quantum circuits for classically intractable instances of the Hamiltonian dynamics simulation problem. npj Quant. Inf. 5, 44 (2019).

K. Wright et al., Benchmarking an 11-qubit quantum computer. Nat. Commun. 10, 5464 (2019).

K. Mølmer, A. Sørensen, Multiparticle entanglement of hot trapped ions. Phys. Rev. Lett. 82, 1835-1838 (1999).

A. Sørensen, K. Mølmer, Quantum computation with ions in thermal motion. Phys. Rev. Lett. 82, 1971-1974 (1999).

T. Choi, S. Debnath, T. A. Manning, C. Figgatt, Z.-X. Gong, L.-M. Duan, C. Monroe, Optimal quantum control of multimode couplings between trapped ion qubits for scalable entanglement. Phys. Rev. Lett. 112, 190502 (2014).

S.-L. Zhu, C. Monroe, L.-M. Duan, Arbitrary-speed quantum gates within large ion crystals through minimum control of laser beams. Europhys. Lett. 73, 485-491 (2006).

C. Figgatt, A. Ostrander, N. M. Linke, K. A. Landsman, D. Zhu, D. Maslov, C. Monroe, Parallel entangling operations on a universal ion trap quantum computer. Nature 572, 368-372 (2019).

Y. Lu, S. Zhang, K. Zhang, W. Chen, Y. Shen, J. Zhang, J.-N. Zhang, K. Kim, Scalable global entangling gates on arbitrary ion qubits. Nature 572, 363-367 (2019).

S. Beauregard, Circuit for Shor's algorithm using qubits. Quant. Inf. Comp. 3, 175-185 (2003).

T. G. Draper, S. A. Kutin, E. M. Rains, K. M. Svore, A logarithmic-depth quantum carry-lookahead adder. Quant. Inf. Comp. 6, 351-369 (2006).

D. Maslov, Y. Nam, Use of global interactions in efficient quantum circuit constructions. New J. Phys. 20, 033018 (2018).

E. Bernstein, U. Vazirani, Quantum complexity theory, SIAM J. Comput. 26, 1411-1473 (1997).

Y. Nam et al., Ground-state energy estimation of the water molecule on a trapped ion quantum computer. npj Quant. Inf. 6, 33 (2020).

W. van Dam, S. Hallgren, L. Ip, Quantum algorithms for some hidden shift problems. SIAM J. Comput. 36, 763-778 (2006).

R. Blumel, N. Grzesiak, Y. Nam, Power-optimal, stabilized entangling gate between trapped-ion qubits. https://arxiv.org/abs/1905.09292https://arxiv.org/abs/1905.09292 (2019).

F. A. Calderon-Vargas, G. S. Barron, X.-H. Deng, A. J. Sigillito, E. Barnes, S. E. Economou, Fast high-fidelity entangling gates in Si double quantum dots. Phys. Rev. B 100, 035304 (2019).

L. S. Theis, F. Motzoi, F. K. Wilhelm, M. Saffman, High-fidelity Rydberg-blockade entangling gate using shaped, analytic pulses. Phys. Rev. A 94, 032306 (2016).

M. M. Müller, H. R. Haakh, T. Calarco, C. P. Koch, C. Henkel, Prospects for fast Rydberg gates on an atom chip. Quant. Inf. Process. 10, 771-792 (2011).

J. M. Gambetta, F. Motzoi, S. T. Merkel, F. K. Wilhelm, Analytic control methods for high-fidelity unitary operations in a weakly nonlinear oscillator. Phys. Rev. A 83, 012308 (2011).

A. Spörl, T. Schulte-Herbrüggen, S. J. Glaser, V. Bergholm, M. J. Storcz, J. Ferber, F. K. Wilhelm, Optimal control of coupled Josephson qubits. Phys. Rev. A 75, 012302 (2007).

G. M. Amdahl, Validity of the single processor approach to achieving large scale computing capabilities. AFIPS Conf. Proc. 30, 483-485 (1967).

S. Debnath, N. M. Linke, C. Figgatt, K. A. Landsman, K. Wright, C. Monroe, Demonstration of a small programmable quantum computer with atomic qubits. Nature 536, 63-66 (2016).

P. H. Leung, K. A. Landsman, C. Figgatt, N. M. Linke, C. Monroe, K. R. Brown, Robust 2-qubit gates in a linear ion crystal using a frequency-modulated driving force. Phys. Rev. Lett. 120, 020501 (2018).

T. R. Tan, J. P. Gaebler, Y. Lin, Y. Wan, R. Bowler, D. Leibfried, D. J. Wineland, Multi-element logic gates for trapped-ion qubits. Nature 528, 380-383 (2015).

V. V. Shende, I. L. Markov, S. S. Bullock, Minimal universal two-qubit controlled-NOT-based circuits. Phys. Rev. A 69, 062321 (2004).

D. Maslov, Basic circuit compilation techniques for an ion-trap quantum machine. New J. Phys. 19, 023035 (2017).

Ye Wang, et al., "High-fidelity Two-qubit Gates Using a MEMS-based Beam Steering System for Individual Qubit Addressing", Cornell University Library, Jul. 17, 2020, pp. 1-8.

Pranav Gokhale, et al., "Partial Compilation of Variational Algorithms for Noisy Intermediate-Scale Quantum Machines", Proceedings of the 52nd Annual IEEE/ACM International Symposium on Microarchitecture, '52 ACM Press, Oct. 12, 2019, pp. 266-278.

International Search Report and Written Opinion dated Aug. 3, 2022 for Application No. PCT/US2021/052985.

* cited by examiner $$\text{SWAP} := \text{✕}, \text{FLIP} := \text{⊕} \quad (5)$$
FIG. 9A
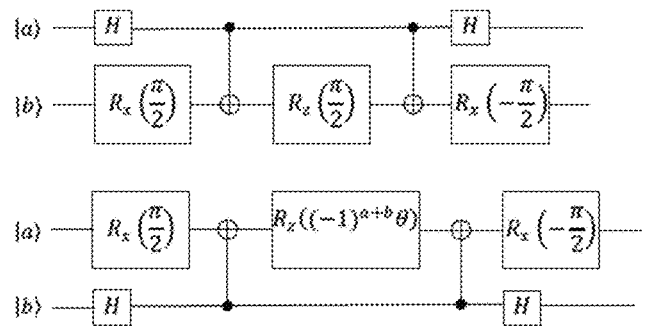
FIG. 9B
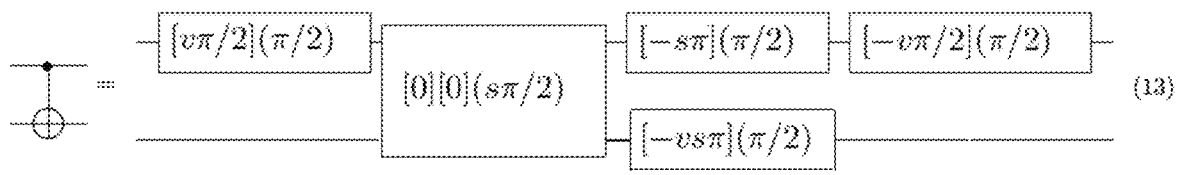
(13)
FIG. 9C
FIG. 9D

$$-\boxed{[\phi](\pi)}-\boxed{[\phi'](\pi)}- = -\boxed{R_z(-2(\phi-\phi'))}-$$

$$-\boxed{[\phi](\pi)}-\boxed{[\phi'](\pi/2)}- = -\boxed{[2\phi-\phi'+\pi](\pi/2)}-\boxed{R_z(-2(a-b))}-$$

$$-\boxed{\begin{array}{c}[\phi](\pi)\\ {}[\varphi|\varphi'](\pi/2)\end{array}}- = -\boxed{[2\phi-\varphi|\varphi'](\pi/2)}-\boxed{R_z(2\phi)}-\boxed{[2\phi](\pi)}-$$

*FIG. 9E*

$$-\boxed{[\phi](\pi)}-\boxed{R_z(\phi')}- = -\boxed{R_z(-(2\phi+\phi'))}-\boxed{[0](\pi)}-$$

*FIG. 9F*

$$-\boxed{[\phi](\pi/2)}-\boxed{[\phi](\pi/2)}- = -\boxed{[\phi](\pi)}-$$

$$-\boxed{[\phi](\pi/2)}-\boxed{[\phi\pm 1/2](\pi/2)}- = -$$

$$-\boxed{[\phi\pm 1/4](\pi/2)}-\boxed{[\phi](\pi/2)}- = -\boxed{[\phi](\pi/2)}-\boxed{R_z(\pm\pi/2)}-$$

*FIG. 9G*

$$-[\phi](\pi/2)-[\phi'](\pi)- = -R_z(-2(\phi-\phi'))-[2\phi'-\phi+\pi](\pi/2)-$$

$$\begin{array}{c}-[\phi](\pi/2)-\\ -[\phi][\phi'](\pi/2)- \end{array} = \begin{array}{c} -[\phi][\phi'](\pi/2)-[\phi](\pi/2)-\\ \end{array}$$

$$\begin{array}{c}-[\phi\pm\pi](\pi/2)-\\ -[\phi][\phi'](\pi/2)- \end{array} = \begin{array}{c} -[\phi][\phi'](\pi/2)-[\phi\pm\pi](\pi/2)-\\ \end{array}$$

FIG. 9H

$$-[\phi](\pi/2)-R_z(\phi')- = -R_z(\phi')-[\phi+\phi'](\pi)-$$

FIG. 9I

$$-[\phi+\pi/2][\phi'+\pi/2](\pi/2)-[\phi][\phi'](\pi/2)-$$
$$= -[\phi-\pi/2][\phi'-\pi/2](\pi/2)-[\phi][\phi'](\pi/2)-$$
$$= ZZ(-\pi/2) - \begin{array}{c} R_z(\phi-\phi')\\ R_z(\phi'-\phi) \end{array}$$

$$-[\phi+\pi/2][\phi'-\pi/2](\pi/2)-[\phi][\phi'](\pi/2)-$$
$$= -[\phi-\pi/2][\phi'+\pi/2](\pi/2)-[\phi][\phi'](\pi/2)-$$
$$= ZZ(\pi/2) - \begin{array}{c} R_z(\phi+\phi')\\ R_z(\phi+\phi') \end{array}$$

OPTIMIZING CIRCUIT COMPILER FOR TRAPPED-ION QUANTUM COMPUTERS

CROSS-REFERENCE TO RELATED APPLICATIONS

This application claims priority to U.S. Provisional Patent Applications Ser. No. 63/086,008, filed on Sep. 30, 2020 and Ser. No. 63/108,786, filed on Nov. 2, 2020, each of which is incorporated by reference herein.

BACKGROUND

Field

The present disclosure generally relates to a method of generating an optimized quantum circuit to run on a quantum computer, and more specifically, to a method of applying converting and optimizing rules to generate an optimized quantum circuit such that the quantum circuit can be efficiently implemented in practice.

Description of the Related Art

In quantum computing, quantum bits or qubits, which are analogous to bits representing a "0" and a "1" in a classical (digital) computer, are required to be prepared, manipulated, and measured (read-out) with near perfect control during a computation process. Imperfect control of the qubits leads to errors that can accumulate over the computation process, limiting the size of a quantum computer that can perform reliable computations.

Among physical systems upon which it is proposed to build large-scale quantum computers, is a chain of ions (i.e., charged atoms), which are trapped and suspended in vacuum by electromagnetic fields. The ions have internal hyperfine states which are separated by frequencies in the several GHz range and can be used as the computational states of a qubit (referred to as "qubit states"). These hyperfine states can be controlled using radiation provided from a laser, or sometimes referred to herein as the interaction with laser beams. The ions can be cooled to near their motional ground states using such laser interactions. The ions can also be optically pumped to one of the two hyperfine states with high accuracy (preparation of qubits), manipulated between the two hyperfine states (single-qubit gate operations) by laser beams, and their internal hyperfine states detected by fluorescence upon application of a resonant laser beam (read-out of qubits). A pair of ions can be controllably entangled (two-qubit gate operations) by a qubit-state dependent force using laser pulses that couple the ions to the collective motional modes of a chain of trapped ions, which arise from their Coulombic interaction between the ions.

In quantum computing, a computation is performed as a sequence of quantum logic gates that act on a small number of qubits. There is a need for designing the sequence of quantum logic gates (referred to as a quantum circuit), such that an implementation of the quantum circuit uses the fewest resources at a desired practical efficiency in large-scale quantum computations.

SUMMARY

Embodiments of the present disclosure provide a method of performing a computation using a quantum computer. The method includes converting, by a classical computer, a first quantum circuit to a second quantum circuit, wherein the first quantum circuit comprises a conventional gate set and the second quantum circuit comprises a standard trapped-ion gate set, generating a first optimized quantum circuit, which comprises the standard trapped-ion gate set, by adjusting the second quantum circuit, by use of the classical computer, converting, by the classical computer, the first optimized quantum circuit to a third quantum circuit comprising a phase-insensitive trapped-ion gate set, generating a second optimized quantum circuit comprising the phase-insensitive trapped-ion gate set, by adjusting the third quantum circuit, by use of the classical computer, and applying the first or the second optimized quantum circuit on a quantum computer to perform a computation.

Embodiments of the present disclosure further provide an ion trap quantum computing system. The ion trap quantum computing system includes a quantum processor comprising a plurality of qubits, each qubit comprising a trapped ion having two hyperfine states, one or more lasers configured to emit a first Raman laser beam and a second Raman laser beam, which is provided to trapped ions in the quantum processor, a classical computer configured to perform operations including converting a first quantum circuit to a second quantum circuit, wherein the first quantum circuit comprises a conventional gate set and the second quantum circuit comprises a standard trapped-ion gate set, generating a first optimized quantum circuit, which comprises the standard trapped-ion gate set, by adjusting the second quantum circuit, converting the first optimized quantum circuit to a third quantum circuit comprising a phase-insensitive trapped-ion gate set, and generating a second optimized quantum circuit comprising the phase-insensitive trapped-ion gate set, by adjusting the third quantum circuit, and a system controller configured to execute a control program to control the one or more lasers to perform operations on the quantum processor, the operations including applying the first or the second optimized quantum circuit on the quantum processor to perform a computation, and measuring population of qubit states in the quantum processor. The classical computer is further configured to output the measured population of qubit states in the quantum processor.

Embodiments of the present disclosure also provide an ion trap quantum computing system. The ion trap quantum computing system includes a classical computer, a quantum processor comprising a plurality of qubits, each qubit comprising a trapped ion having two hyperfine states, a system controller configured to execute a control program to control one or more lasers to perform operations on the quantum processor, and non-volatile memory having a number of instructions stored therein which, when executed by one or more processors, causes the ion trap quantum computing system to perform operations including converting, by the classical computer, a first quantum circuit to a second quantum circuit, wherein the first quantum circuit comprises a conventional gate set and the second quantum circuit comprises a standard trapped-ion gate set, generating a first optimized quantum circuit, which comprises the standard trapped-ion gate set, by adjusting the second quantum circuit, by use of the classical computer, converting, by the classical computer, the first optimized quantum circuit to a third quantum circuit comprising a phase-insensitive trapped-ion gate set, generating a second optimized quantum circuit comprising the phase-insensitive trapped-ion gate set, by adjusting the third quantum circuit, by use of the classical computer, and applying, by the system controller, the first or the second optimized quantum circuit on a quantum computer to perform a computation, measuring, by the system controller, population of qubit states in the quantum processor, and outputting, by the classical computer, the measured population of qubit states in the quantum processor.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 9A, 9B, 9C, 9D, 9E, 9F, 9G, 9H, 9I, 9J, 9K, 9L, 9M, 9N, 9O, and 9P each depict a quantum circuit.

Figure 1:
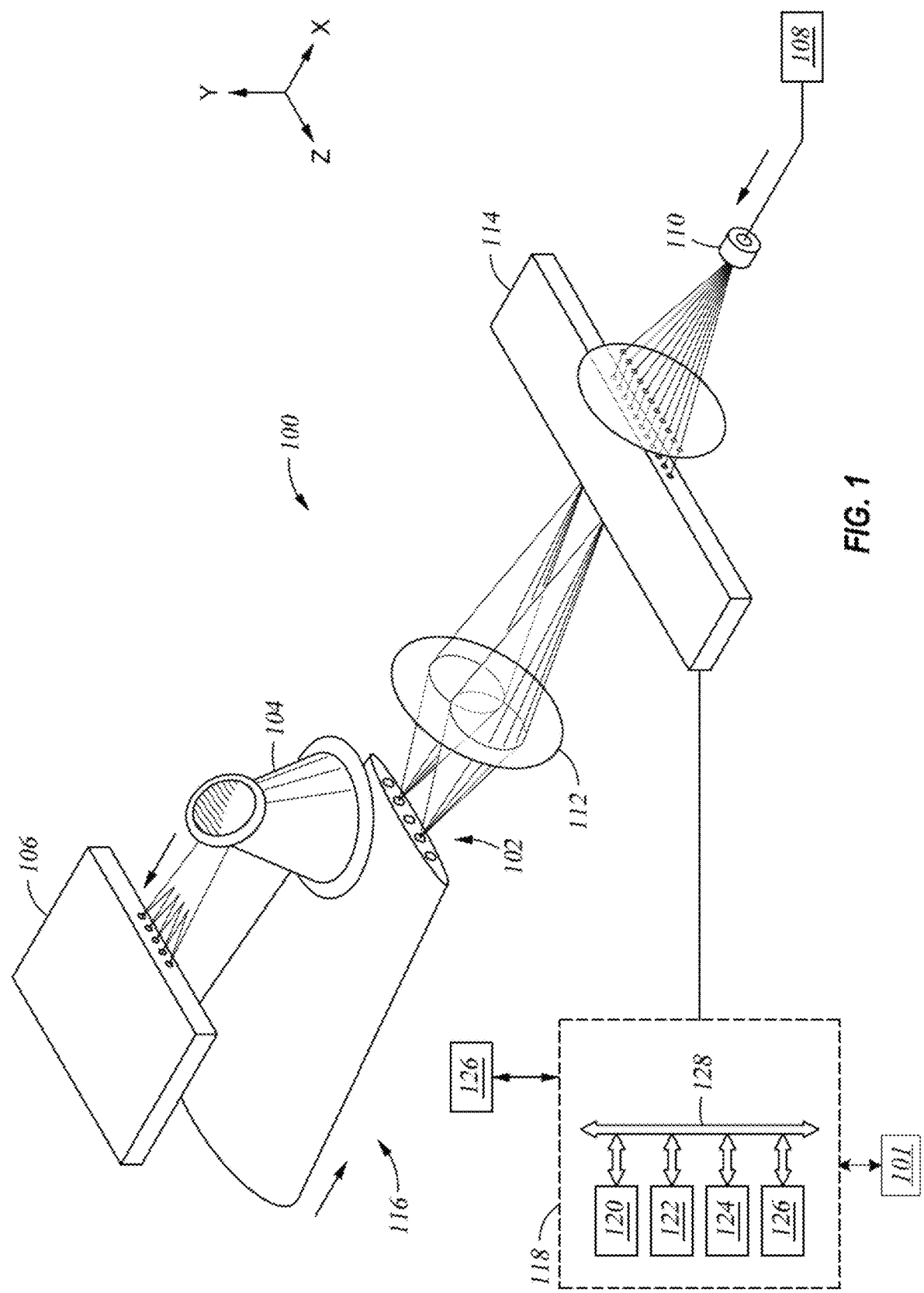
FIG. 1 is a partial view of an ion trap quantum computer according to one embodiment.

To facilitate understanding, identical reference numerals have been used, where possible, to designate identical elements that are common to the figures. In the figures and the following description, an orthogonal coordinate system including an X-axis, a Y-axis, and a Z-axis is used. The directions represented by the arrows in the drawing are assumed to be positive directions for convenience. It is contemplated that elements disclosed in some embodiments may be beneficially utilized on other implementations without specific recitation.

DETAILED DESCRIPTION

In quantum computing, a computation is performed as a sequence of quantum logic gates that act on a small number of qubits. This sequence, also referred to as a quantum circuit, may be implemented with an available set of universal quantum logic gates (referred to simply as a "gate set" or a "quantum gate set" hereinafter). It is advantageous to find a method for compiling a quantum circuit such that an implementation of the quantum circuit uses the fewest resources at a desired practical efficiency in large-scale quantum computations.

An overall system that is able to perform quantum computations using trapped ions will include a classical computer, a system controller, and a quantum register. The classical computer performs supporting and system control tasks including selecting a quantum algorithm to be run by use of a user interface, such as graphics processing unit (GPU), compiling the selected quantum algorithm into a series of universal quantum logic gates, translating the series of universal quantum logic gates into laser pulses to apply on the quantum register, and pre-calculating parameters that optimize the laser pulses by use of a central processing unit (CPU). A software program for performing the task of decomposing and executing the quantum algorithms is stored in a non-volatile memory within or accessible to the classical computer. The quantum register includes trapped ions that are coupled with various hardware, including lasers to manipulate internal hyperfine states (qubit states) of the trapped ions and an acousto-optic modulator to modulate the laser beam and to read-out the internal hyperfine states (qubit states) of the trapped ions. The system controller receives from the classical computer the pre-calculated parameters for pulses at the beginning of running the selected algorithm on the quantum register, controls various hardware associated with controlling any and all aspects used to run the selected algorithm on the quantum register, and returns a read-out of the quantum register and thus output of results of the quantum computation(s) at the end of running the algorithm to the classical computer.

Among several known sets of universal quantum logic gates by which any quantum algorithm can be decomposed, a set of universal quantum logic gates, commonly denoted as $\{[\phi](\theta), [\phi][\phi'](\theta)\}$, is native to a quantum computing system of trapped ions described herein. Here, the $[\phi](\theta)$ gates correspond to single-qubit operations (i.e., manipulation of individual qubit states of trapped ions, also referred to as "single-qubit gates"), and the $[\phi][\phi'](\theta)$ gate corresponds to a two-qubit operation (i.e., manipulation of the entanglement of two trapped ions, also referred to as an "entangling gate"). For those of ordinary skill in the art, it should be clear that the $[\phi](\theta)$ gates can be implemented with near perfect fidelity, while the formation of the $[\phi][\phi'](\theta)$ gate is complex and requires optimization for a given type of trapped ions, number of ions in a chain of trapped ions, and the hardware and environment in which the trapped ions are trapped, to name just a few factors, such that the fidelity of the $[\phi][\phi'](\theta)$ gate is increased and computational errors within a quantum computer are avoided or decreased.

I. General Hardware Configurations

FIG. 1 is a partial view of an ion trap quantum computer, or system 100, according to one embodiment. The system 100 includes a classical (digital) computer 101, a system controller 118 and a quantum register that is a chain 102 of trapped ions (i.e., five shown) that extend along the Z-axis. Each ion in the chain 102 of trapped ions is an ion having a nuclear spin I and an electron spin S such that a difference between the nuclear spin I and the electron spin S is zero, such as a positive ytterbium ion, $^{171}Yb^+$, a positive barium ion $^{33}Ba^+$, a positive cadmium ion $^{111}Cd^+$ or $^{113}Cd^+$, which all have a nuclear spin I=½ and the $^2S_{1/2}$ hyperfine states. In some embodiments, all ions in the chain 102 of trapped ions are the same species and isotope (e.g., $^{171}Yb^+$). In some other embodiments, the chain 102 of trapped ions includes one or more species or isotopes (e.g., some ions are $^{171}Yb^+$ and some other ions are $^{133}Ba^+$). In yet additional embodiments, the chain 102 of trapped ions may include various isotopes of the same species (e.g., different isotopes of Yb, different isotopes of Ba). The ions in the chain 102 of trapped ions are individually addressed with separate laser beams.

The classical computer 101 includes a central processing unit (CPU), memory, and support circuits (or I/O). The memory is connected to the CPU, and may be one or more of a readily available memory, such as a read-only memory (ROM), a random access memory (RAM), floppy disk, hard disk, or any other form of digital storage, local or remote. Software instructions, algorithms and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like.

An imaging objective 104, such as an objective lens with a numerical aperture (NA), for example, of 0.37, collects fluorescence along the Y-axis from the ions and maps each ion onto a multi-channel photo-multiplier tube (PMT) 106 for measurement of individual ions. Non-copropagating Raman laser beams from a laser 108, which are provided along the X-axis, perform operations on the ions. A diffractive beam splitter 110 creates an array of static Raman beams 112 that are individually switched using a multi-channel acousto-optic modulator (AOM) 114 and is configured to selectively act on individual ions. A global Raman laser beam 116 illuminates ions at once. In some embodiments, individual Raman laser beams 116 (not shown) each illuminate individual ions. The system controller (also referred to as a "RF controller") 118 controls the AOM 114. The system controller 118 includes a central processing unit (CPU) 120, a read-only memory (ROM) 122, a random access memory (RAM) 124, a storage unit 126, and the like. The CPU 120 is a processor of the RF controller 118. The ROM 122 stores various programs and the RAM 124 is the working memory for various programs and data. The storage unit 126 includes a nonvolatile memory, such as a hard disk drive (HDD) or a flash memory, and stores various programs even if power is turned off. The CPU 120, the ROM 122, the RAM 124, and the storage unit 126 are interconnected via a bus 128. The RF controller 118 executes a control program which is stored in the ROM 122 or the storage unit 126 and uses the RAM 124 as a working area. The control program will include one or more software applications that include program code (e.g., instructions) that may be executed by a processor in order to perform various functionalities associated with receiving and analyzing data and controlling any and all aspects of the methods and hardware used to create the ion trap quantum computer system 100 discussed herein.

Figure 2:
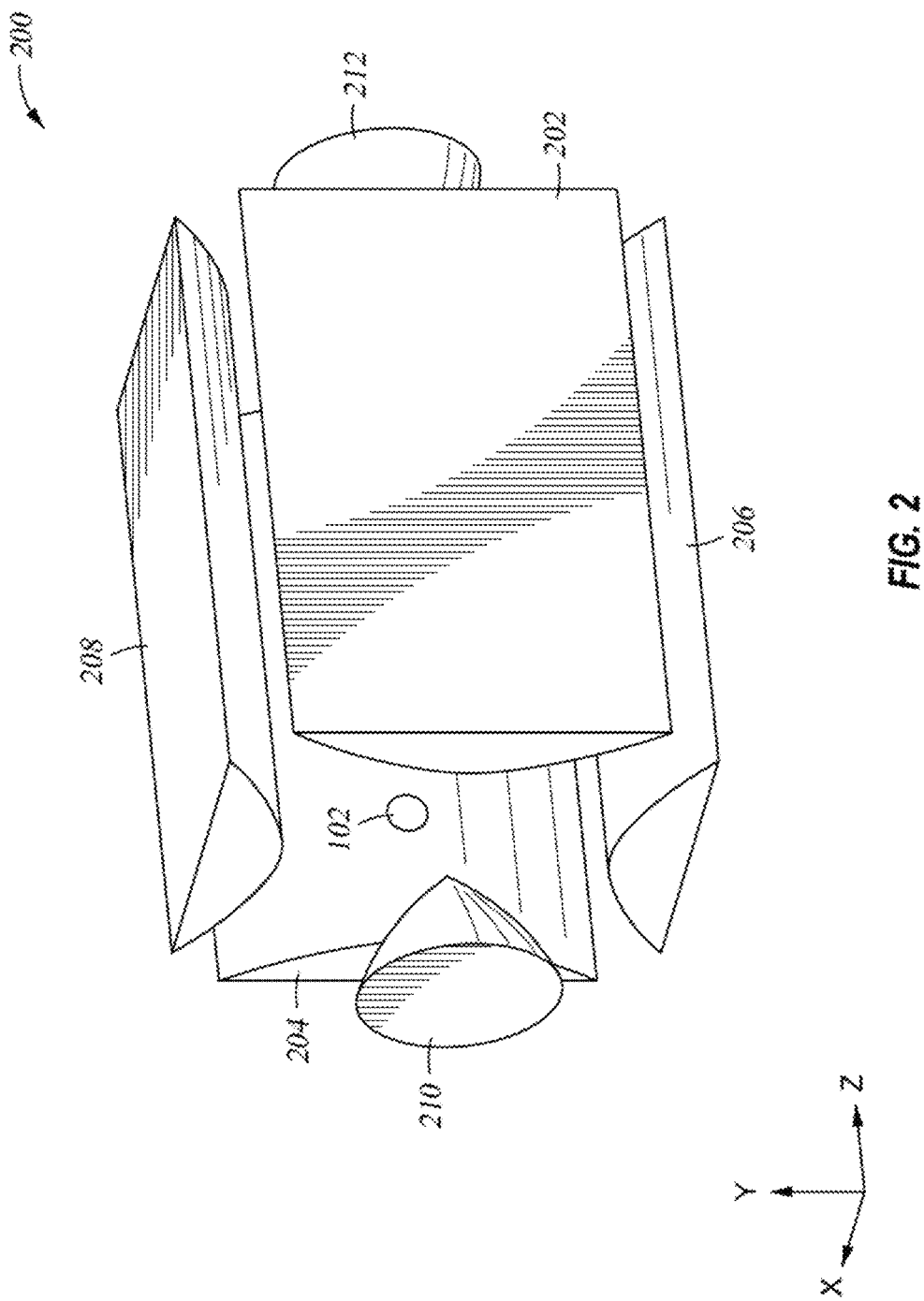
FIG. 2 depicts a schematic view of an ion trap for confining ions in a chain according to one embodiment.

FIG. 2 depicts a schematic view of an ion trap 200 (also referred to as a Paul trap) for confining ions in the chain 102 according to one embodiment. The confining potential is exerted by both static (DC) voltage and radio frequency (RF) voltages. A static (DC) voltage Vs is applied to end-cap electrodes 210 and 212 to confine the ions along the Z-axis (also referred to as an "axial direction," "longitudinal direction," or "first direction"). The ions in the chain 102 are nearly evenly distributed in the axial direction due to the Coulomb interaction between the ions. In some embodiments, the ion trap 200 includes four hyperbolically-shaped electrodes 202, 204, 206, and 208 extending along the Z-axis.

During operation, a sinusoidal voltage $V_1$ (with an amplitude $V_{RF}/2$) is applied to an opposing pair of the electrodes 202, 204 and a sinusoidal voltage $V_2$ with a phase shift of 180° from the sinusoidal voltage $V_1$ (and the amplitude $V_{RF}/2$) is applied to the other opposing pair of the electrodes 206, 208 at a driving frequency $\omega_{RF}$, generating a quadrupole potential. In some embodiments, a sinusoidal voltage is only applied to one opposing pair of the electrodes 202, 204, and the other opposing pair 206, 208 is grounded. The quadrupole potential creates an effective confining force in the X-Y plane perpendicular to the Z-axis (also referred to as a "radial direction," "transverse direction," or "second direction") for each of the trapped ions, which is proportional to a distance from a saddle point (i.e., a position in the axial direction (Z-direction)) at which the RF electric field vanishes. The motion in the radial direction (i.e., direction in the X-Y plane) of each ion is approximated as a harmonic oscillation (referred to as secular motion) with a restoring force towards the saddle point in the radial direction and can be modeled by spring constants $k_x$ and $k_y$, respectively, as is discussed in greater detail below. In some embodiments, the spring constants in the radial direction are modeled as equal when the quadrupole potential is symmetric in the radial direction. However, undesirably in some cases, the motion of the ions in the radial direction may be distorted due to some asymmetry in the physical trap configuration, a small DC patch potential due to inhomogeneity of a surface of the electrodes, or the like and due to these and other external sources of distortion the ions may lie off-center from the saddle points.

II. Trapped Ion Configuration and Quantum Bit Information

Figure 3A:
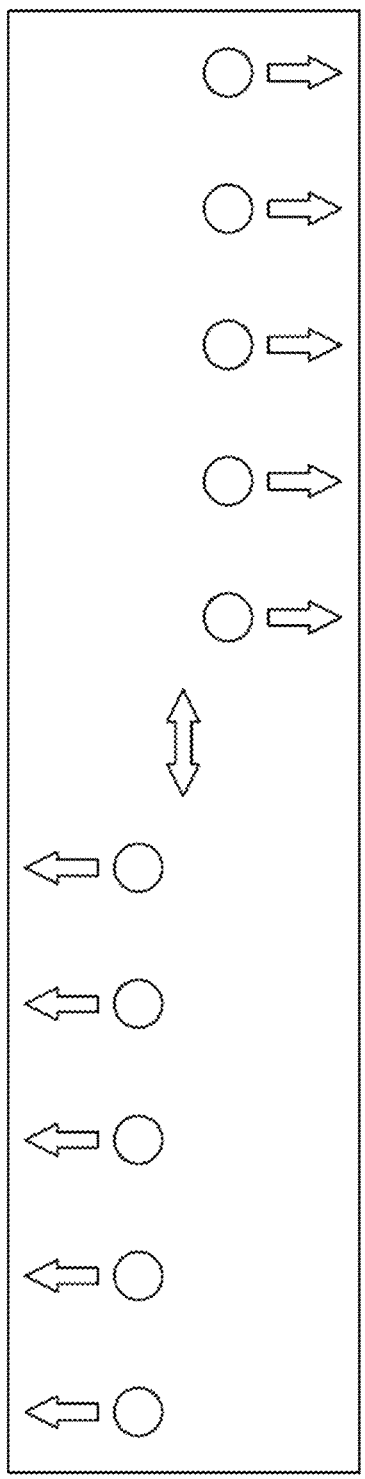
FIGS. 3A, 3B, and 3C depict a few schematic collective transverse motional mode structures of a chain of five trapped ions.
Figure 3B:
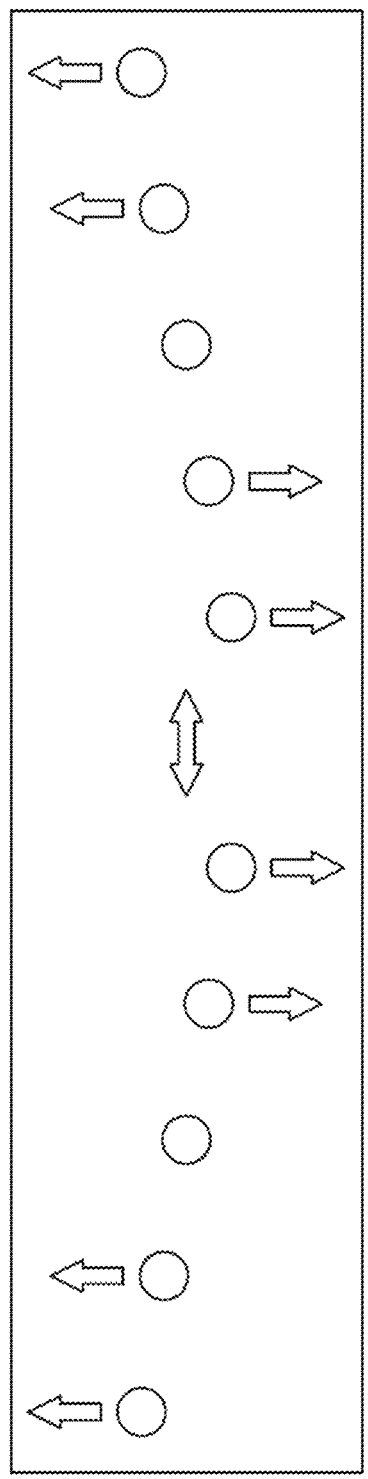
Figure 3C:
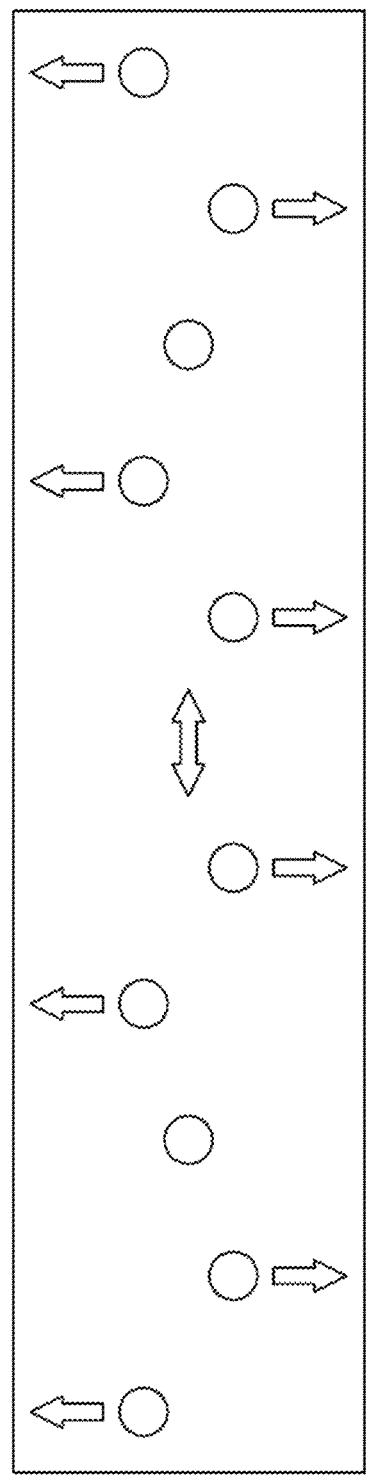

FIGS. 3A, 3B, and 3C depict a few schematic structures of collective transverse motional modes (also referred to simply as "motional mode structures") of a chain 102 of five trapped ions, for example. Here, the confining potential due to a static voltage VS applied to the end-cap electrodes 210 and 212 is weaker compared to the confining potential in the radial direction. The collective motional modes of the chain 102 of trapped ions in the transverse direction are determined by the Coulomb interaction between the trapped ions combined with the confining potentials generated by the ion trap 200. The trapped ions undergo collective transversal motions (referred to as "collective transverse motional modes," "collective motional modes," or simply "motional modes"), where each mode has a distinct energy (or equivalently, a frequency) associated with it. A motional mode having the p-th lowest energy is hereinafter referred to as $|n_{ph}\rangle_p$, where $n_{ph}$ denotes the number of motional quanta (in units of energy excitation, referred to as phonons) in the motional mode, and the number of motional modes P in a given transverse direction is equal to the number of trapped ions N in the chain 102. FIGS. 3A-3C schematically illustrate examples of different types of collective transverse motional modes that may be experienced by five trapped ions that are positioned in a chain 102. FIG. 3A is a schematic view of a common motional mode $|n_{ph}\rangle_P$ having the highest energy, where P is both the number of the mode and the total number of motional modes. In the common motional mode $|n_{ph}\rangle_p$, all ions oscillate in phase in the transverse direction. FIG. 3B is a schematic view of a tilt motional mode $|n_{ph}\rangle_{P-1}$ which has the second highest energy. In the tilt motional mode, ions on opposite ends move out of phase in the transverse direction (i.e., in opposite directions). FIG. 3C is a schematic view of a higher-order motional mode $|n_{ph}\rangle_{P-3}$ which has a lower energy than that of the tilt motional mode $|n_{ph}\rangle_{P-1}$, and in which the ions move in a more complicated mode pattern.

It should be noted that the particular configuration described above is just one among several possible examples of a trap for confining ions according to the present disclosure and does not limit the possible configurations, specifications, or the like of traps according to the present disclosure. For example, the geometry of the electrodes is not limited to the hyperbolic electrodes described above. In other examples, a trap that generates an effective electric field causing the motion of the ions in the radial direction as harmonic oscillations may be a multi-layer trap in which several electrode layers are stacked and an RF voltage is applied to two diagonally opposite electrodes, or a surface trap in which all electrodes are located in a single plane on a chip. Furthermore, a trap may be divided into multiple segments, adjacent pairs of which may be linked by shuttling one or more ions, or coupled by photon interconnects. A trap may also be an array of individual trapping regions arranged closely to each other on a micro-fabricated ion trap chip. In some embodiments, the quadrupole potential has a spatially varying DC component in addition to the RF component described above.

Figure 4:
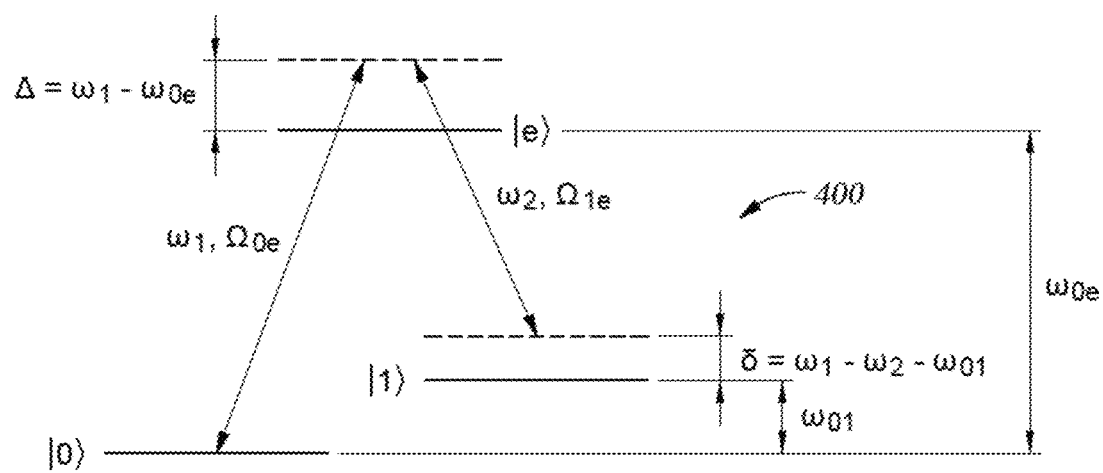
FIG. 4 depicts a schematic energy diagram of each ion in a chain of trapped ions according to one embodiment.

FIG. 4 depicts a schematic energy diagram 400 of each ion in the chain 102 of trapped ions according to one embodiment. Each ion in the chain 102 of trapped ions is an ion having a nuclear spin I and an electron spin S such that a difference between the nuclear spin I and the electron spin S is zero. In one example, each ion may be a positive ytterbium ion, $^{171}Yb^+$, which has a nuclear spin I=½ and the $^2S_{1/2}$ hyperfine states (i.e., two electronic states) with an energy split corresponding to a frequency difference (referred to as a "carrier frequency") of $\omega_{01}/2\pi=12.642821$ GHz. In other examples, each ion may be a positive barium ion $^{133}Ba^+$, a positive cadmium ion $^{111}Cd^+$ or $^{113}Cd^+$, which all have a nuclear spin I=½ and the $^2S_{1/2}$ hyperfine states. A qubit is formed with the two hyperfine states, denoted as $|0\rangle$ and $|1\rangle$, where the hyperfine ground state (i.e., the lower energy state of the $^2S_{1/2}$ hyperfine states) is chosen to represent $|0\rangle$. Hereinafter, the terms "hyperfine states," "internal hyperfine states," and "qubits" may be interchangeably used to represent $|0\rangle$ and $|1\rangle$. Each ion may be cooled (i.e., kinetic energy of the ion may be reduced) to near the motional ground state $|0\rangle_p$ for any motional mode p with no phonon excitation (i.e., $n_{ph}=0$) by known laser cooling methods, such as Doppler cooling or resolved sideband cooling, and then the qubit state prepared in the hyperfine ground state $|0\rangle$ by optical pumping. Here, $|0\rangle$ represents the individual qubit state of a trapped ion whereas $|0\rangle_p$ with the subscript p denotes the motional ground state for a motional mode p of a chain 102 of trapped ions.

An individual qubit state of each trapped ion may be manipulated by, for example, a mode-locked laser at 355 nanometers (nm) via the excited $^2P_{1/2}$ level (denoted as $|e\rangle$). As shown in FIG. 4, a laser beam from the laser may be split into a pair of non-copropagating laser beams (a first laser beam with frequency $\omega_1$ and a second laser beam with frequency $\omega_2$) in the Raman configuration, and detuned by a one-photon transition detuning frequency $\Delta=\omega_1-w_{0e}$ with respect to the transition frequency $\omega_{0e}$ between $|0\rangle$ and $|e\rangle$, as illustrated in FIG. 4. A two-photon transition detuning frequency $\delta$ includes adjusting the amount of energy that is provided to the trapped ion by the first and second laser beams, which when combined is used to cause the trapped ion to transfer between the hyperfine states $|0\rangle$ and $|1\rangle$. When the one-photon transition detuning frequency $\Delta$ is much larger than a two-photon transition detuning frequency (also referred to simply as "detuning frequency") $\delta=\omega_1-\omega_2-w_{01}$ (hereinafter denoted as $\pm\mu$, $\mu$ being a positive value), single-photon Rabi frequencies $\Omega_{0e}(t)$ and $\Omega_{1e}(t)$ (which are time-dependent, and are determined by amplitudes and phases of the first and second laser beams), at which Rabi flopping between states $|0\rangle$ and $|e\rangle$ and between states $|1\rangle$ and $|e\rangle$ respectively occur, and a spontaneous emission rate from the excited state $|e\rangle$, Rabi flopping between the two hyperfine states $|0\rangle$ and $|1\rangle$ (referred to as a "carrier transition") is induced at the two-photon Rabi frequency $\Omega(t)$. The two-photon Rabi frequency $\Omega(t)$ has an intensity (i.e., absolute value of amplitude) that is proportional to $\Omega_{0e}\Omega_{1e}/2\Delta$, where $\Omega_{0e}$ and $\Omega_{1e}$ are the single-photon Rabi frequencies due to the first and second laser beams, respectively. Hereinafter, this set of non-copropagating laser beams in the Raman configuration to manipulate internal hyperfine states of qubits (qubit states) may be referred to as a "composite pulse" or simply as a "pulse," and the resulting time-dependent pattern of the two-photon Rabi frequency $\Omega(t)$ may be referred to as an "amplitude" of a pulse or simply as a "pulse," which are illustrated and further described below. The detuning frequency $\delta=\omega_1-\omega_2-\omega_{01}$ may be referred to as detuning frequency of the composite pulse or detuning frequency of the pulse. The amplitude of the two-photon Rabi frequency $\Omega(t)$, which is determined by amplitudes of the first and second laser beams, may be referred to as an "amplitude" of the composite pulse.

It should be noted that the particular atomic species used in the discussion provided herein is just one example of atomic species which have stable and well-defined two-level energy structures when ionized and an excited state that is optically accessible, and thus is not intended to limit the possible configurations, specifications, or the like of an ion trap quantum computer according to the present disclosure. For example, other ion species include alkaline earth metal ions ($Be^+$, $Ca^+$, $Sr^+$, Mg+, and $Ba^+$) or transition metal ions ($Zn^+$, $Hg^+$, $Cd^+$).

Figure 5:
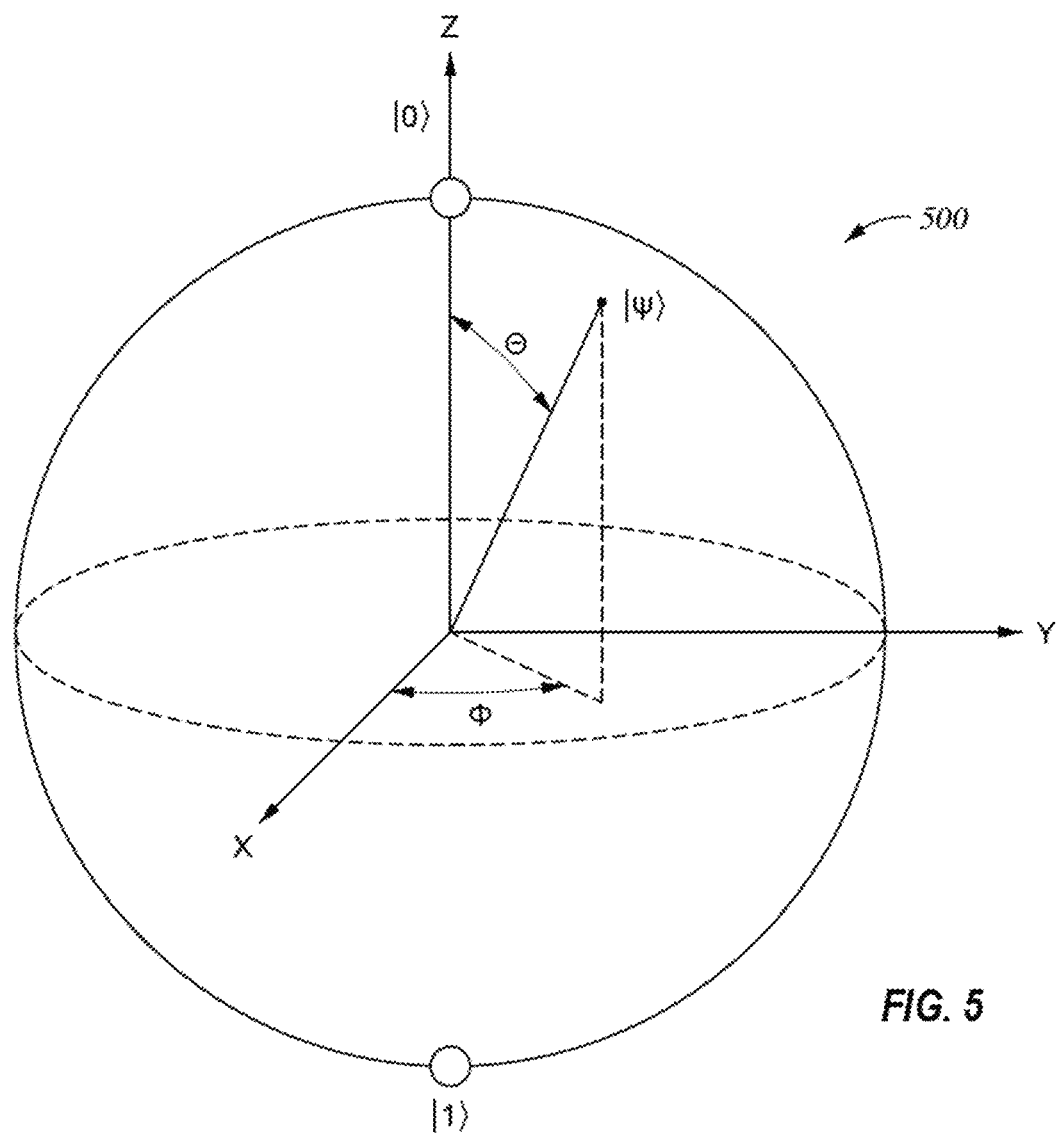
FIG. 5 depicts a qubit state of an ion represented as a point on a surface of the Bloch sphere.

FIG. 5 is provided to help visualize a qubit state of an ion, represented as a point on the surface of the Bloch sphere 500 with an azimuthal angle $\phi$ and a polar angle $\theta$. Application of the composite pulse as described above, causes Rabi flopping between the qubit state $|0\rangle$ (represented as the north pole of the Bloch sphere) and $|1\rangle$ (the south pole of the Bloch sphere) to occur. Adjusting time duration and amplitudes of the composite pulse flips the qubit state from $|0\rangle$ to |1) (i.e., from the north pole to the south pole of the Bloch sphere), or the qubit state from $|1\rangle$ to $|0\rangle$ (i.e., from the south pole to the north pole of the Bloch sphere). This application of the composite pulse is referred to as a "π-pulse". Further, by adjusting time duration and amplitudes of the composite pulse, the qubit state $|0\rangle$ may be transformed to a superposition state $|0\rangle+|1\rangle$, where the two qubit states $|0\rangle$ and $|1\rangle$ are added and equally-weighted in-phase (a normalization factor of the superposition state is omitted hereinafter for convenience) and the qubit state $|1\rangle$ to a superposition state $|0\rangle-|1\rangle$, where the two qubit states $|0\rangle$ and $|1\rangle$ are added equally-weighted but out of phase. This application of the composite pulse is referred to as a "π/2-pulse". More generally, a superposition of the two qubits states $|0\rangle$ and $|1\rangle$ that are added and equally-weighted is represented by a point that lies on the equator of the Bloch sphere. For example, the superposition states $|0\rangle\pm|1\rangle$ correspond to points on the equator with the azimuthal angle $\phi$ being zero and $\pi$, respectively. The superposition states that correspond to points on the equator with the azimuthal angle $\phi$ are denoted as $|0\rangle+e^{i\phi}|1\rangle$ (e.g., $|0\rangle\pm i|1\rangle$ for $\phi=\pm\pi/2$). Transformation between two points on the equator (i.e., a rotation about the Z-axis on the Bloch sphere) can be implemented by shifting phases of the composite pulse.

Figure 6A:
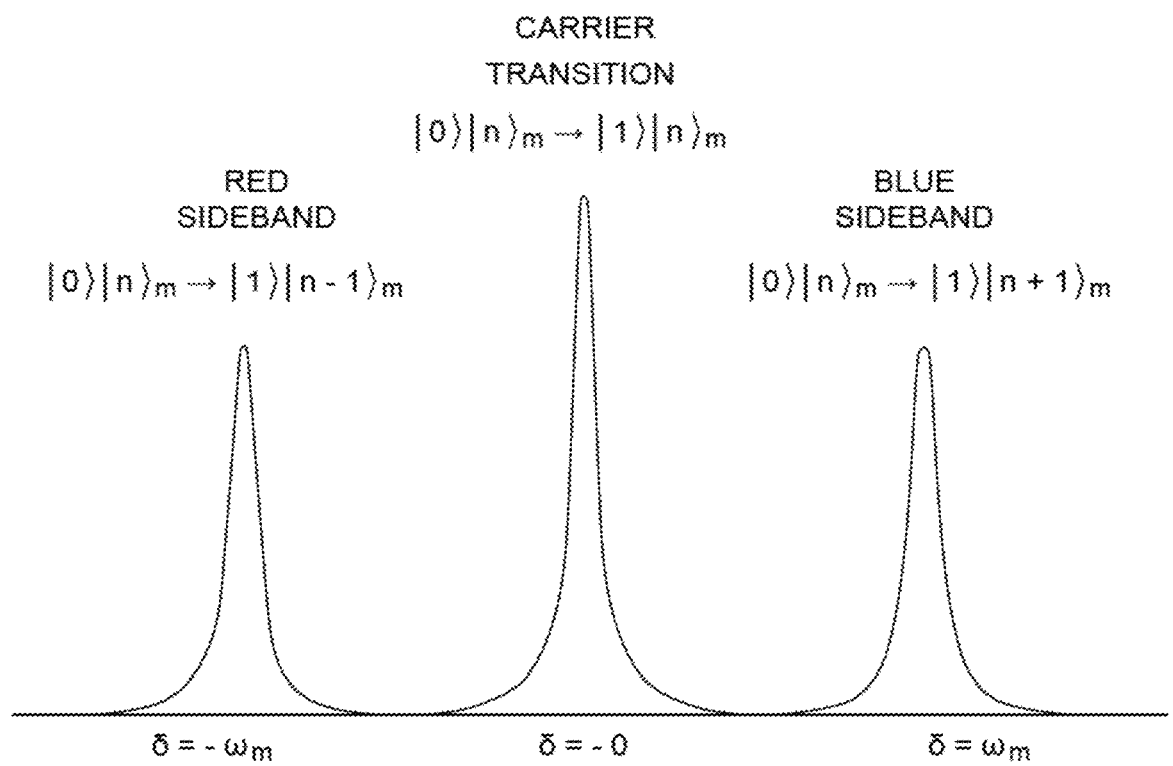
FIGS. 6A and 6B depict schematic views of motional sideband spectrum of each ion and a motional mode according to one embodiment.
Figure 6B:
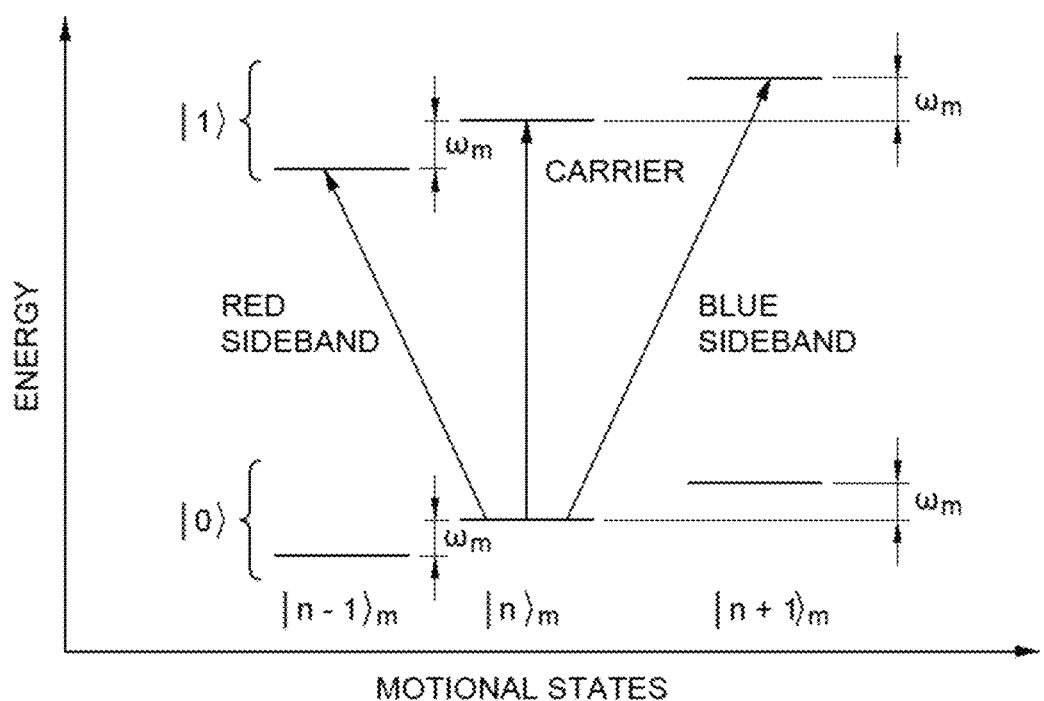

In an ion trap quantum computer, the motional modes may act as a data bus to mediate entanglement between two qubits and this entanglement is used to perform a $[\phi][\phi'](\theta)$ gate operation. That is, each of the two qubits is entangled with the motional modes, and then the entanglement is transferred to an entanglement between the two qubits by using motional sideband excitations, as described below. FIGS. 6A and 6B schematically depict views of a motional sideband spectrum for an ion in the chain 102 in a motional mode $|n_{ph}\rangle_p$ having frequency $\omega_p$ according to one embodiment. As illustrated in FIG. 6B, when the detuning frequency of the composite pulse is zero (i.e., a frequency difference between the first and second laser beams is tuned to the carrier frequency, $\delta=\omega_1-\omega_2-\omega_{01}=0$), simple Rabi flopping between the qubit states $|0\rangle$ and $|1\rangle$ (carrier transition) occurs. When the detuning frequency of the composite pulse is positive (i.e., the frequency difference between the first and second laser beams is tuned higher than the carrier frequency, $\delta=\omega_1-\omega_2-\omega_{01}=\mu>0$, referred to as a blue sideband), Rabi flopping between combined qubit-motional states $|0\rangle|n_{ph}\rangle_p$ and $|1\rangle|n_{ph}+1\rangle_p$ occurs (i.e., a transition from the p-th motional mode with n-phonon excitations denoted by $|n_{ph}\rangle_p$ to the p-th motional mode with $(n_{ph}+1)$-phonon excitations denoted by $|n_{ph}+1\rangle_p$ occurs when the qubit state $|0\rangle$ flips to $|1\rangle$). When the detuning frequency of the composite pulse is negative (i.e., the frequency difference between the first and second laser beams is tuned lower than the carrier frequency by the frequency $\omega_p$ of the motional mode $|n_{ph}\rangle_p$, $\delta=\omega_1-\omega_2-\omega_{01}=\mu<0$, referred to as a red sideband), Rabi flopping between combined qubit-motional states $|0\rangle|n_{ph}\rangle_p$ and $|1\rangle|n_{ph}-1\rangle_p$ occurs (i.e., a transition from the motional mode $|n_{ph}\rangle_p$ to the motional mode $|n_{ph}-1\rangle_p$ with one less phonon excitations occurs when the qubit state $|0\rangle$ flips to $|1\rangle$). A π/2-pulse on the blue sideband applied to a qubit transforms the combined qubit-motional state $|0\rangle|n_{ph}\rangle_p$ into a superposition of $|0\rangle|n_{ph}\rangle$, and $|1\rangle|n_{ph}+1\rangle_p$. A π/2-pulse on the red sideband applied to a qubit transforms the combined qubit-motional $|0\rangle|n_{ph}\rangle_p$ into a superposition of $|0\rangle|n_{ph}\rangle_p$ and $|1\rangle|n_{ph}-1\rangle_p$. When the two-photon Rabi frequency $\Omega(t)$ is smaller as compared to the detuning frequency $\delta=\omega_1-\omega_2-\omega_{01}=\pm\mu$ the blue sideband transition or the red sideband transition may be selectively driven. Thus, a qubit can be entangled with a desired motional mode by applying the right type of pulse, such as a π/2-pulse, which can be subsequently entangled with another qubit, leading to an entanglement between the two qubits. Entanglement between qubits is needed to perform a $[\phi][\phi'](\theta)$ gate operation in an ion trap quantum computer.

By controlling and/or directing transformations of the combined qubit-motional states as described above, a $[\phi][\phi'](\theta)$ gate operation may be performed on two qubits (i-th and j-th qubits). In general, the $[(\phi][\phi'](\theta)$ gate operation (with maximal entanglement, i.e., $\theta=\pi/2$) respectively transforms, up to normalization, two-qubit states $|0\rangle_i|0\rangle_j$, $|0\rangle_i|1\rangle_j$, $|1\rangle_i|0\rangle_j$, and $|1\rangle_i|1\rangle_j$ as follows:

$|0\rangle_i|0\rangle_j \rightarrow |0\rangle_i|0\rangle_j - ie^{i(\phi+\phi')}|1\rangle_i|1\rangle_j$ $|0\rangle_i|1\rangle_j \rightarrow |0\rangle_i|1\rangle_j - ie^{i(\phi-\phi')}|1\rangle_i|0\rangle_j$ $|1\rangle_i|0\rangle_j \rightarrow -ie^{-i(\phi-\phi')}|0\rangle_i|1\rangle_j + |1\rangle_i|0\rangle_j$ $|1\rangle_i|1\rangle_j \rightarrow -ie^{-i(\phi+\phi')}|0\rangle_i|0\rangle_j + |1\rangle_i|1\rangle_j$ For example, when the two qubits (i-th and j-th qubits) are both initially in the hyperfine ground state $|0\rangle$ (denoted as $|0\rangle_i|0\rangle_j$) and subsequently a π/2-pulse on the blue sideband is applied to the i-th qubit, the combined state of the i-th qubit and the motional mode $|0\rangle_i|n_{ph}\rangle_p$ is transformed into a superposition of $|0\rangle_i|n_{ph}\rangle_p$ and $|1\rangle_i|n_{ph}+1\rangle_p$, and thus the combined state of the two qubits and the motional mode is transformed into a superposition of $|0\rangle_i|0\rangle_j|n_{ph}\rangle_p$ and $|1\rangle_i|0\rangle_j|n_{ph}+1\rangle_p$. When a π/2-pulse on the red sideband is applied to the j-th qubit, the combined state of the j-th qubit and the motional mode $|0\rangle_j|n_{ph}\rangle_p$ is transformed to a superposition of $|0\rangle_j|n_{ph}\rangle_p$ and $|1\rangle_j|n_{ph}-1\rangle_p$ and the combined state $|0\rangle_j|n_{ph}+1\rangle_p$ is transformed into a superposition of $|0\rangle_j|n_{ph}+1\rangle_p$ and $|1\rangle_j|n_{ph}\rangle_p$.

Thus, applications of a π/2-pulse on the blue sideband on the i-th qubit and a π/2-pulse on the red sideband on the j-th qubit may transform the combined state of the two qubits and the motional mode $|0\rangle_i|0\rangle_j|n_{ph}\rangle$ into a superposition of $|0\rangle_i|0\rangle_j|n_{ph}\rangle_p$ and $|1\rangle_i|1\rangle_j|n_{ph}\rangle_p$, the two qubits now being in an entangled state. For those of ordinary skill in the art, it should be clear that two-qubit states that are entangled with a motional mode having a different number of phonon excitations from the initial number of phonon excitations $n_{ph}$ (i.e., $|1\rangle_i|0\rangle_j|n_{ph}+1\rangle_p$ and $|0\rangle_i|1\rangle_j|n_{ph}-1\rangle_p$) can be removed by a sufficiently complex pulse sequence, and thus the combined state of the two qubits and the motional mode after the $[\phi][\phi'](\theta)$ gate operation may be considered disentangled as the initial number of phonon excitations $n_{ph}$ in the p-th motional mode stays unchanged at the end of the $[\phi][\phi'](\theta)$ gate operation. Thus, qubit states before and after the $[\phi][\phi'](\theta)$ gate operation will be described below generally without including the motional modes.

More generally, the combined state of i-th and j-th qubits transformed by the application of the composite pulse on the sidebands for duration τ (referred to as a "gate duration"), having an amplitude function $\Omega(t)$ and a detuning frequency function $\mu(t)$, can be described in terms of an entangling interaction $\chi_{i,j}(\tau)$ as follows:

$|0\rangle_i|0\rangle_j \rightarrow \cos(\chi_{i,j}(\tau)/2)|0\rangle_i|0\rangle_j - ie^{i(\phi+\phi')}\sin(\chi_{i,j}(\tau)/2)|1\rangle_i|1\rangle_j$ $|0\rangle_i|1\rangle_j \rightarrow \cos(\chi_{i,j}(\tau)/2)|0\rangle_i|1\rangle_j - ie^{i(\phi-\phi')}\sin(\chi_{i,j}(\tau)/2)|1\rangle_i|0\rangle_j$ $|1\rangle_i|0\rangle_j \rightarrow -ie^{-i(\phi-\phi')}\sin(\chi_{i,j}(\tau)/2)|0\rangle_i|1\rangle_j + \cos(\chi_{i,j}(\tau)/2)|1\rangle_i|0\rangle_j$ $$|1\rangle_i|1\rangle_j \to -ie^{-(\phi+\phi')}\sin(\chi_{i,j}(\tau)/2)|0\rangle_i|0\rangle_j +$$
$$\cos(\chi_{i,j}(\tau)/2)|1\rangle_i|1\rangle_j$$

where, $$\chi_{i,j}(\tau) = 4\sum_{p=1}^{P}\eta_{i,p}\eta_{j,p}\int_0^\tau dt\int_0^t dt' \Omega(t)\Omega(t')\sin(\psi(t))\sin(\psi(t'))\sin[\omega_p(t'-t)],$$

$\eta_{i,p}$ is the Lamb-Dicke parameter that quantifies the coupling strength between the i-th ion and the p-th motional mode having the frequency $\omega_p$, $\psi(t)$ is an accumulated phase function (also referred to simply as a "phase function")

$$\psi(t) = \psi_0 + \int_0^t \mu(t')dt'$$

of the pulse, $\psi_0$ is an initial phase which may be assumed to be zero (0) hereinafter for simplicity without loss of generality, and P is the number of the motional modes (equal to the number N of ions in the chain 102).

III. Construction of Pulses for Entangling Gate Operations

The entanglement between two qubits (trapped ions) described above can be used to perform a $[\phi]/[\phi'](\theta)$ gate operation. The $[\phi][\phi'](\theta)$-gate operation along with single-qubit operations ($[\phi](\theta)$ gates) forms a set of universal quantum logic gates $\{[\phi](\theta), [\phi][\phi'](\theta)\}$ that can be used to build a quantum computer to perform desired computational processes. In constructing a pulse to deliver to the chain 102 of trapped ions for performing a $[\phi][\phi'](\theta)$ gate operation between two trapped ions (e.g., i-th and j-th trapped ions) in the chain 102, an amplitude function $\Omega(t)$ and a detuning frequency function $\mu(t)$ of the pulse are adjusted as control parameters to ensure the pulse performs the intended $[\phi][\phi'](\theta)$ gate operation, by imposing the following conditions. First, all trapped ions in the chain 102 that are displaced from their initial positions as the motional modes are excited by the delivery of the pulse must return to the initial positions at the end of the $[\phi][\phi'](\theta)$ gate operation. This first condition is referred to as condition for returning of trapped ions to their original positions and momentum values, or condition for closure of phase space trajectories, as described below in detail. Second, the $[\phi][\phi'](\theta)$ gate operation must be robust and stabilized against fluctuations in frequencies of the motional modes. This second condition is referred to as condition for stabilization. Third, entangling interaction $\chi_{i,j}(\tau)$ generated between i-th and j-th trapped ions by the pulse must have a desired value $\theta_{i,j}$ $$(0 < \theta_{i,j} \leq \pi/2).$$

This third condition is referred to as condition for non-zero entangling interaction. Fourth, required laser power to implement a pulse may be minimized. This fourth condition is referred to as condition for minimized power.

As described above, the first condition (also referred to as condition for returning of trapped ions to their original positions and momentum values, or condition for closure of phase space trajectories) is that the trapped ions that are displaced from their initial positions as the motional modes are excited by the delivery of the pulse return to the initial positions. A l-th trapped ion in a superposition state $|0\rangle \pm |1\rangle$ is displaced due to the excitation of the p-th motional mode during the gate duration $\tau$ and follows the trajectories $\pm\alpha_{l,p}(t')$ in phase space (position and momentum) of the p-th motional mode. The phase space trajectories $$\alpha_{l,p}(t') = \int_0^{t'} g(t)e^{i\omega_p t}dt$$

are determined by the amplitude function $\Omega(t)$ and the accumulated phase function $$\psi(t) = \int_0^t \mu(t')dt'$$

of the pulse, where g(t) is a pulse function defined as $g(t) = \Omega(t)\sin(\psi(t))$. Thus, for the chain 102 of N trapped ions, the condition $\alpha_{l,p}(\tau) = 0$ (i.e., the trajectories $\alpha_{l,p}(\tau)$ are closed) must be imposed for all the P motional modes (p=1, 2, ..., P).

The second condition (also referred to as condition for stabilization) is that a $[\phi][\phi'](\theta)$ gate operation generated by the pulse is robust and stabilized against external errors, such as fluctuations in the frequencies $\omega_p$ of the motional modes and the intensities of laser beams. In the ion trap quantum computer, or system 100, there can be fluctuations in the frequencies $\omega_p$ of the motional modes due to stray electric fields, build-up charges in the ion trap 200 caused by photoionization or temperature fluctuations. Typically over a time span of minutes, the frequencies $\omega_p$ of the motional modes drift with excursion of $\Delta\omega_p/(2\pi) \approx 1$ kHz. The condition for closure of phase space trajectories based on the frequencies $\omega_p$ of the motional modes are no longer satisfied when the frequencies of the motional modes have drifted to $\omega_p + \Delta\omega_p$, resulting in a reduction of the fidelity of the $[\phi][\phi'](\theta)$ gate operation. It is known the average infidelity $1-F$ of a $[\phi][\phi'](\theta)$ gate operation between the i-th and j-th trapped ions at zero temperature of the motional-mode phonons, is given by $$1 - F = \frac{4}{5}\sum_p (|\alpha_{i,p}|^2 + |\alpha_{j,p}|^2).$$

This suggests the $[\phi][\phi'](\theta)$ gate operation can be stabilized against a drift $\Delta\omega_p$ in the frequencies $\omega_p$ of the motional modes by requiring that the phase space trajectories $\alpha_{l,p}$ (l=i,j) be stationary up to k-th order with respect to variations $\Delta w_p$ in $\omega_p$, $$\frac{\partial^k \alpha_{l,p}(\tau)}{\partial \omega_p^k} = \int_0^\tau dt(it)^k g(t)e^{i\omega_p t} = 0$$

$$(l = 1, 2, \ldots, N, p = 1, 2, \ldots, P, k = 1, 2, \ldots, K)$$

(referred to as K-th order stabilization), where K is a maximal desired degree of stabilization. The pulse computed by requiring this condition for stabilization can perform a $[\phi][\phi'](\theta)$ gate operation that is resilient against noise (i.e., a drift in the frequencies $\omega_p$ of the motional modes).

The third condition (also referred to as condition for non-zero entangling interaction) is that the entangling interaction $\chi_{i,j}(\tau)$ generated between the i-th and j-th trapped ions by the pulse has a desired non-zero value $$\theta_{i,j}(0 < \theta_{i,j} \leq \pi/2).$$

The transformations of the combined state of the i-th and j-th trapped ions described above correspond to the $[\phi][\phi'](\theta)$ gate operation with maximal entanglement when $|\theta_{i,j}|=\pi/2$. In the example described below, the same pulse is applied to both the i-th and the j-th trapped ions. However, in some embodiments, different pulses are applied to the i-th and the j-th trapped ions.

The fourth condition (also referred to as condition for minimized power) is that the pulse is power-optimal, in which the required laser power is minimized. Since the required laser power is inversely proportional to the gate duration $\tau$, a power-optimal pulse implements a $[\phi][\phi'](\theta)$ gate operation with minimum power requirement if the gate duration $\tau$ is fixed, or with shortest gate duration $\tau$ if the laser power budget is fixed.

In some embodiments, the amplitude function $\Omega(t)$ and the detuning frequency function $\mu(t)$ are chosen to be symmetric or anti-symmetric in time with respect to the middle point of the gate duration, $$t = \frac{\tau}{2}, \text{i.e., } \Omega^{(\pm)}\left(\frac{\tau}{2} - t\right) = \pm\Omega^{(\pm)}\left(\frac{\tau}{2} + t\right), \mu^{(\pm)}\left(\frac{\tau}{2} - t\right) = \pm\mu^{(\pm)}\left(\frac{\tau}{2} + t\right).$$

In the example described below, the amplitude function $\Omega(t)$ and the detuning frequency function $\mu(t)$ are chosen to be symmetric ($\Omega^{(+)}(t)$ and $\mu^{(+)}(t)$) for simplicity and may be referred to as $\Omega(t)$ and $\mu(t)$ without the subscript (+). With the symmetric detuning frequency function $\mu(t)$, the accumulated phase function $\psi(t)$ is anti-symmetric, i.e., $$\sin\left(\psi\left(\frac{\tau}{2} - t\right)\right) = -\sin\left(\psi\left(\frac{\tau}{2} + t\right)\right).$$

The condition for closure of phase space trajectories can be rewritten in terms of the anti-symmetric component $g^{(-)}(t)$ of the pulse function $g(t)$ (also referred to as "negative-parity pulse function" or simply as "pulse function" hereinafter), as $$\alpha_{l,p}(\tau) =$$

$$\int_0^\tau g^{(-)}(t)e^{i\omega_p t}dt = 0 \mapsto \sum_{n=1}^{N_A} M_{pn}B_n = 0 (l = 1, 2, \ldots, N, p = 1, 2, \ldots, P),$$

where $M_{pn}$ is defined as $$M_{pn} = \int_0^\tau \sin\left(2\pi n \frac{t}{\tau}\right) e^{i\omega_p t} dt (p = 1, 2, \ldots, P, n = 1, 2, \ldots, N_A).$$

Here the pulse function $g^{(-)}(t)$ is expanded in a complete basis, for example, a Fourier-sine basis $$g^{(-)}(t) = \sum_{n=1}^{N_A} B_n \sin(2\pi nt/\tau)$$

over the gate duration $\tau$, using basis functions $\sin(2\pi nt/\tau)$ and Fourier coefficients $B_n$ ($n=1, 2, \ldots, N_A$). Equivalently, the condition for closure of phase space trajectories can be written as $M\vec{B}=0$ in a matrix form, where M is a P×$N_A$ coefficient matrix of $M_{pn}$ and B is a $N_A$ Fourier coefficient vector of $B_n$. The number of the basis functions $N_A$ is chosen to be larger than the number of motional modes P and large enough to achieve convergence in the computing of the pulse function $g^{(-)}(t)$.

The condition for K-th order stabilization against fluctuations in the frequencies $\omega_p$ of the motional modes can be rewritten in a matrix form as $$\frac{\partial^k \alpha_{l,p}(\tau)}{\partial \omega_p^k} = \left(\frac{\partial^k}{\partial \omega_p^k}\right) \int_0^\tau g^{(-)}(t)e^{i\omega_p t}dt = \int_0^\tau (it)^k g^{(-)}(t)e^{i\omega_p t}dt = 0$$

$$\mapsto \sum_{n=1}^{N_A} M_{pn}^k B_n = 0(l = 1, 2, \ldots, N, p = 1, 2, \ldots, P, k = 1, 2, \ldots, K),$$

where $M_{pn}^k$ is defined as $$M_{pn}^k = \int_0^\tau (it)^k \sin\left(\frac{2\pi n t}{\tau}\right) e^{i\omega_p t} dt (p = 1, 2, \ldots, P, n = 1, 2, \ldots, N_A).$$

Equivalently, the condition for K-th order stabilization can be written as $M^k\vec{B}=0$ (k=1, 2, ..., K) in a matrix form, where $M^k$ is a P×$N_A$ coefficient matrix of $M_{pn}^k$ and $\vec{B}$ is a $N_A$ Fourier coefficient vector of $B_n$.

The condition for closure of phase space trajectories and the condition for K-th order stabilization can be written concisely in the form $$\sum_{n=1}^{N_A} M_{pn}^k B_n = 0(l = 1, 2, \ldots, N, p = 1, 2, \ldots, P, k = 0, 1, \ldots, K)$$

where k=0 corresponds to the condition for closure of phase space trajectories. Thus, there are $N_0(=N_A-P(K+1))$ non-trivial (i.e., at least one of the Fourier coefficients $B_n$ is non-zero) Fourier coefficient vectors (referred to as null-space vectors) $\vec{B}^{(\alpha)}(\alpha=1, 2, \ldots, N_0)$ that satisfy the condition for closure of phase space trajectories and the condition for stabilization $$\left(\sum_{n=1}^{N_A} M_{pn}^k B_n = 0, k = 1, 2, \ldots, K\right).$$

Once these null-space vectors $\vec{B}^{(\alpha)}$ ($\alpha=1, 2, \ldots, N_0$) are computed, the Fourier coefficient vector $\vec{B}$ of $B_n$ can be constructed by computing a linear combination $$\left(\sum_{\alpha=1}^{N_0} \Lambda_\alpha \vec{B}^{(\alpha)}\right)$$

of the Fourier coefficient vectors $\vec{B}^{(\alpha)}$, in which the coefficients $\kappa_\alpha$ are determined such that the remaining conditions, the condition for non-zero entangling interaction and the condition for minimized power, are satisfied.

The condition for non-zero entangling interaction can be rewritten in terms of the pulse function $g^{(-)}(t)$ as $$\chi_{i,j}(\tau) = 4\sum_{p=1}^{P} \eta_{i,p}\eta_{j,p} \int_0^\tau dt \int_0^t dt' g_i^{(-)}(t)g_j^{(-)}(t')\sin[\omega_p(t'-t)] = \theta_{i,j},$$

$$\mapsto \sum_{n=1}^{N_A}\sum_{m=1}^{N_A} B_n D_{nm} B_m = \theta_{i,j},$$

where $D_{nm}$ is defined as $$D_{nm} = 4\sum_{p=1}^{P} \eta_{i,p}\eta_{j,p} \int_0^\tau dt \int_0^t dt' \sin\left(2\pi n \frac{t}{\tau}\right)\sin[\omega_p(t'-t)]\sin\left(2\pi m \frac{t'}{\tau}\right),$$

or equivalently, $\vec{B}^T D \vec{B} = \theta_{i,j}$ in a matrix form, where D is a $N_A \times N_A$ coefficient matrix of $D_{nm}$ and $\vec{B}^T$ is a transposed vector of $\vec{B}$.

The condition for minimized power corresponds to minimizing a power function, $$P(t) = \|g^{(-)}(t)\|^2 = 2/\tau \int_0^\tau [g^{(-)}(t)]^2 dt = \sum_{n=1}^{N_A} B_n^2$$

that is the absolute square value of the pulse function $g^{(-)}(t)$ averaged over the gate duration $\tau$.

Thus, the amplitude function $\Omega(t)$ and the detuning frequency function $\mu(t)$ of a pulse can be computed based on the pulse function $g^{(-)}(t)$ having the Fourier coefficients $B_n$ ($n=1, 2, \ldots, N_A$) (i.e., frequency components of the pulse function $g^{(-)}(t)$) or equivalently the Fourier coefficient vector $\vec{B}$, that satisfy the condition for closure of phase space trajectory, the condition for stabilization, the condition for non-zero entangling interaction, and the condition for minimized power. It should be noted that these conditions are in linear algebraic forms in terms of the Fourier coefficient vector $\vec{B}$. Thus, the Fourier coefficients $B_n$ that satisfy these conditions can be computed by known linear algebraic computational methods without approximation or iterations. Once the Fourier coefficients $B_n$ are computed, the pulse function $g^{(-)}(t)$ can be computed.

Once the pulse function $$g^{(-)}(t) = \sum_{n=1}^{N_A} B_n \sin(2\pi n t/\tau)$$

using basis functions $$\sin(2\pi n t/\tau)$$

and Fourier coefficients $B_n$ ($n=1, 2, \ldots, N_A$) is computed, the amplitude function $\Omega(t)$ and the detuning frequency function $\mu(t)$ of the pulse need to be demodulated from the computed pulse function $g^{(-)}(t)=\Omega(t)\sin(\psi(t))$, where the phase function $$\psi(t) = \int_0^t \mu(t')dt'$$

is the phase accumulated due to the detuning frequency function $\mu(t)$. That is, the amplitude function $\Omega(t)$ and the detuning frequency function $\mu(t)$ are extracted from the pulse function $g^{(-)}(t)$ such that a pulse having the amplitude function $\Omega(t)$ and the detuning frequency function $\mu(t)$ can be implemented. If this demodulation process is performed with a fixed detuning frequency, i.e., $\mu(t)=\mu_0$, the resulting pulse is an amplitude-modulated (AM) pulse, in which the amplitude function $\Omega(t)$ is modulated. If the demodulation process is performed with a fixed amplitude, i.e., $\Omega(t)=\Omega_0$, the resulting pulse is a phase-modulated (PM) pulse, in which the phase function $\psi(t)$ is modulated. If the phase function $\psi(t)$ is implemented by modulating detuning frequency function $\mu(t)$, the resulting pulse is a frequency-modulated (FM) pulse. The demodulation process can be performed in any combined modulation of amplitude function $\Omega(t)$, phase function $\psi(t)$ (thereby the detuning frequency function $\mu(t)$), and frequency to construct a pulse by conventional demodulation methods known in the art of signal processing.

The first step of an exemplary demodulation process is to define an auxiliary function $$G(t) = -H[g^{(-)}(t)] = \sum_{n=1}^{N_A} B_n \cos(2\pi n t/\tau),$$

where $H[g^{(-)}(t)]$ is the Hilbert-transform of the pulse function $g^{(-)}(t)$ and a complex auxiliary function $f(t)=G(t)+ig^{(-)}(t)$. The complex auxiliary function $f(t)$ can be written in the polar form using the absolute value of the complex auxiliary function $f(t)$, $|f(t)|$ (written as R(t) hereinafter), and the argument of the complex auxiliary function $f(t)$, $\arg(f(t))$ (written as $\varphi(t)$ hereinafter), as $f(t)=R(t)e^{i\varphi(t)}$. The imaginary part of the complex auxiliary function $f(t)$, denoted as $\Im(f(t))$, corresponds to the pulse function $g^{(-)}(t)$. From a comparison of the imaginary part of the complex auxiliary function $f(t)$, $\Im(f(t))=R(t)\sin[\varphi(t)]$ and the definition of the pulse function $g^{(-)}(t)=\Omega(t)\sin[\psi(t)]$, the amplitude function $\Omega(t)$ can be analytically computed as $$\Omega(t) = R(t) = |f(t)| = \pm\sqrt{G^2(t)+g^2(t)}.$$

There are two branches of the amplitude function $\Omega(t)$, corresponding to a positive envelope function of the pulse function $g^{(-)}(t)$ and a negative envelope function of the pulse function $g^{(-)}(t)$. If there are no simultaneous zeros of the pulse function $g^{(-)}(t)$ and the auxiliary function G(t), no crossings of the positive and negative branches of the amplitude function $\Omega(t)$ occur. That is, the positive branch of the amplitude function $\Omega(t)$ is continuous over the gate duration τ (0≤t≤τ). The negative branch of the amplitude function Ω(t) is also continuous over the gate duration τ (0≤t≤τ).

The phase function ψ(t) varies in the range [−∞, ∞] and thus the argument φ(t) of the complex auxiliary function $f$(t) is computed such that the resulting phase function ψ(t) is continuous over the gate duration τ (0≤t≤τ). Using the branch of the arccos function that satisfies 0≤arccos(ξ)≤π, ξ∈[1,−1], and the function Arg[z] defined as $$\mathrm{Arg}[z] = \begin{cases} \arccos\left(\frac{x}{r}\right), & \text{if } y \geq 0 \\ 2\pi - \arccos\left(\frac{x}{r}\right), & \text{if } y < 0, \end{cases}$$

the phase function ψ(t) can also be analytically computed as

ψ(t)=φ(t)=arg($f$(t))=Arg[$f$(t)]+2πN(t), where r=$\sqrt{x^2+y^2}$ is defined for a complex number z=x+iy, and the function N(t) is a step function of t that is an integer determined such that the resulting phase function ψ(t) is continuous over the gate duration τ (0≤t≤τ).

The detuning frequency function μ(t) can also be analytically computed using the analytically computed phase function $$\psi(t) = \psi_0 + \int_0^t \mu(t')dt'$$

and the analytically computed amplitude function Ω(t) as $$\mu(t) = \psi'(t) = \frac{[G'(t) + ig^{(-)'}(t)]e^{-i\psi(t)} - \Omega'(t)}{i\Omega(t)},$$

where ψ'(t), Ω'(t), and $g^{(-)'}$(t) are time-derivatives of the phase function ψ(t), the amplitude function Ω(t), and the pulse function $g^{(-)}$(t), respectively. It should be noted that the amplitude function Ω(t) and the phase function ψ(t) that are computed analytically in the embodiments herein are continuous functions that do not have any abrupt changes in value in the time domain.

IV. Optimized Circuit Compiler

In quantum computing, a computation is performed by applying a quantum circuit that includes a sequence of quantum logic gates that act on a small number of qubits on a quantum computer. A quantum circuit that is optimized for a particular quantum computing system, a trapped-ion quantum computer (TIQC) in the example described herein, is advantageous to reduce resources required for practical implementation, and thus enabling a large-scale quantum computation.

Figure 7:
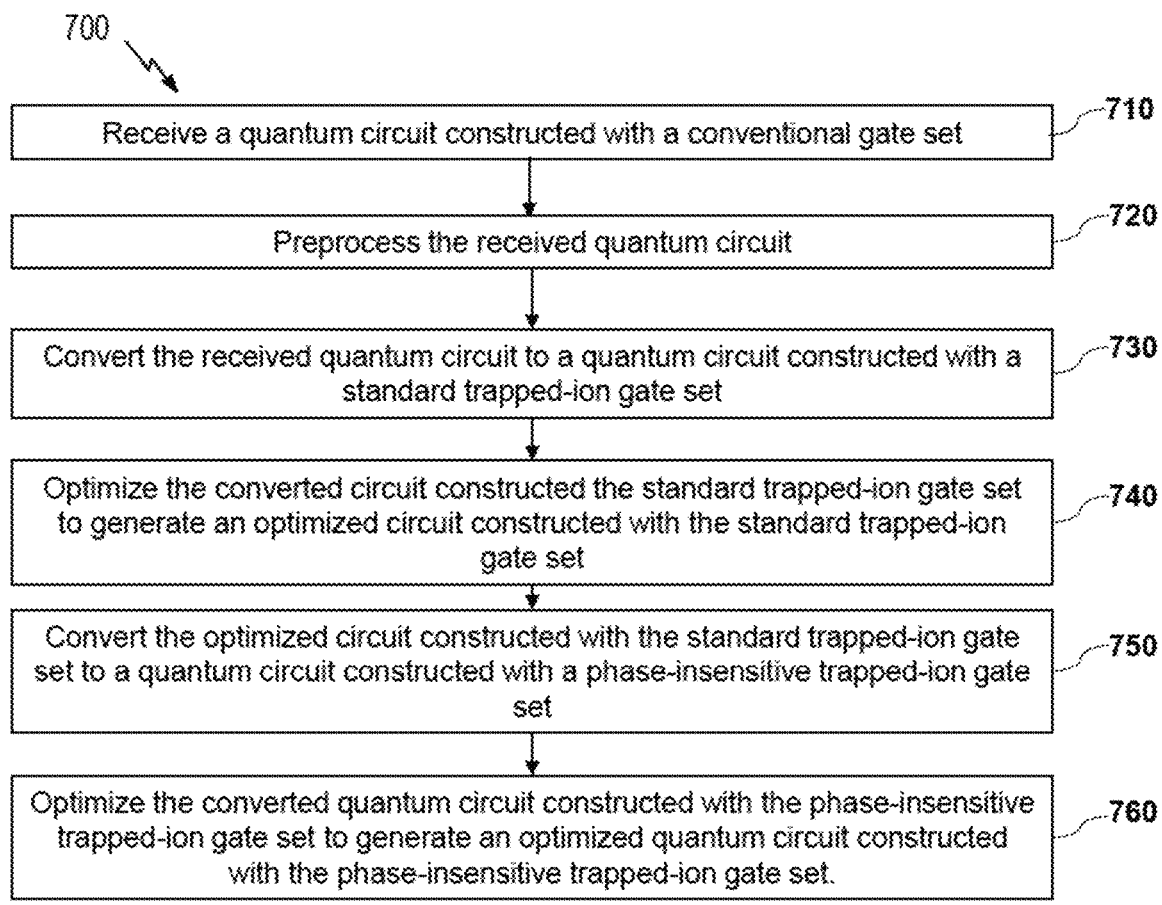
FIG. 7 illustrates a flow diagram of pre-processing, conversion, and optimizing process that may be used to straightforwardly translate a known quantum circuit constructed with a conventional gate set to a quantum circuit constructed with a TIQC gate set, according to one embodiment.

This section is structured as follows. In Subsection IV. A, definitions and notations of a conventional gate set and trapped-ion quantum computer (TIQC) gate sets are introduced. In Subsection IV. B, a method of pre-processing a quantum circuit constructed with the standard gate set is presented. In Subsection IV. C, an efficient method to convert a quantum circuit constructed with the standard gate set to a quantum circuit constructed with a standard TIQC gate set is presented. In Subsection IV. D, numerous optimizing subroutines in the standard TIQC gate set are presented. In Subsection IV.E, optimizing subroutines applicable for a phase-insensitive TIQC gate set are described. FIG. 7 illustrates a flow diagram of pre-processing, conversion, and optimization process 700 that may be used to straightforwardly translate a known quantum circuit constructed with the conventional gate set to a quantum circuit constructed with the phase-insensitive TIQC gate set.

IV. A Definition and Notation of Gate Sets

Conventional Quantum Gate Set

A conventional quantum gate set to construct circuits to perform quantum logic operations may include single-qubit gates, a NOT gate, a Hadamard gate H, and a phase shift gate $R_z(\theta)$, and a two-qubit gate, a CNOT gate. The NOT gate inverts qubit states (i.e., the qubit states |0⟩ and |1⟩ are transformed to |1⟩ and |0⟩, respectively). The Hadamard gate H transforms the qubit states |0⟩ and |1⟩ into $$\frac{1}{\sqrt{2}}(|0\rangle + |1\rangle) \text{ and } \frac{1}{\sqrt{2}}(|0\rangle - |1\rangle),$$

respectively. The phase shift gate $R_z(\theta)$ corresponds to a rotation about the Z-axis on the Bloch sphere shown in FIG. 5 and transforms the qubits states |0⟩ and |1⟩ into $$e^{-i\frac{\theta}{2}}|0\rangle \text{ and } e^{i\frac{\theta}{2}}|1\rangle,$$

respectively. These gates are represented in a matrix form and notated as below.

$$NOT := \begin{pmatrix} 0 & 1 \\ 1 & 0 \end{pmatrix}, \tag{1}$$

$$H := \frac{1}{\sqrt{2}}\begin{pmatrix} 1 & 1 \\ 1 & -1 \end{pmatrix} = -\boxed{H}-,$$

$$R_z(\theta) := \begin{pmatrix} e^{-i\frac{\theta}{2}} & 0 \\ 0 & e^{i\frac{\theta}{2}} \end{pmatrix} = -\boxed{R_z(\theta)}-, \text{ and}$$

$$CNOT := \begin{pmatrix} 1 & 0 & 0 & 0 \\ 0 & 1 & 0 & 0 \\ 0 & 0 & 0 & 1 \\ 0 & 0 & 1 & 0 \end{pmatrix}.$$

In some embodiments, other single-qubit gates ([φ](θ) gates), such as a $R_y$ gate that corresponds to a rotation about the Y-axis on the Bloch shere, and $R_x$ gate that corresponds to a rotation about the X-axis on the Bloch shere, are used to construct quantum circuits. It should be noted that these single-qubit gates can be formed as combinations of the Hadamard gate H and the phase shift gate $R_z(\theta)$. In some other embodiments, S:=$R_z(\pi/2)$, T: =$R_z(\pi/4)$, and their inverses are used as a part of the single-qubit gates in a gate set.

Trapped Ion Quantum Computer Gate Set

In a trapped ion quantum computer (TIQC), a different gate set may be used. The standard get set in a trapped ion quantum computer (referred to as a "standard TIQC gate set) includes single-qubit gates, [ϕ](π) and [ϕ](π/2), and a two-qubit gate, $$[\phi][\phi']\left(\frac{\pi}{2}\right):$$

$$[\phi](\pi) := e^{-i\frac{\pi}{2}\sigma_\phi} = -\boxed{[\phi](\pi)}-, \quad (2)$$

$$[\phi]\left(\frac{\pi}{2}\right) := e^{-i\frac{\pi}{4}\sigma_\phi} = -\boxed{[\phi]\left(\frac{\pi}{2}\right)}-, \text{ and}$$

$$[\phi][\phi']\left(\frac{\pi}{2}\right) := e^{-i\frac{\pi}{4}\sigma_\phi \otimes \sigma_{\phi'}} = \boxed{[\phi][\phi']\left(\frac{\pi}{2}\right)}$$

where $\sigma_\phi = \cos(\phi)\sigma_x + \sin(\phi)\sigma_y$ and $\sigma_x$ and $\sigma_y$ are the Pauli-x and y matrices, respectively. In some embodiments, the rotation angles π or π/2 in [ϕ] and [ϕ][ϕ'] gates can in principle be modified to assume a real degree of freedom, useful, for example, in quantum simulations of chemical systems.

In some embodiments, several more two-qubit gates are additionally used to construct quantum circuits. An extended TIQC gate set may additionally include two-qubit gates, a ZZ gate and a SWAP gate:

$$ZZ\left(\frac{\pi}{2}\right) := e^{-i\frac{\pi}{4}\sigma_z \otimes \sigma_z} = \boxed{ZZ\left(\frac{\pi}{2}\right)}, \quad (3)$$

$$SWAP := \begin{pmatrix} 1 & 0 & 0 & 0 \\ 0 & 0 & 1 & 0 \\ 0 & 1 & 0 & 0 \\ 0 & 0 & 0 & 1 \end{pmatrix},$$

where $\sigma_z$ is the Pauli-z matrix.

In one example, a phase-insensitive TIQC gate set that includes the single-qubit gates, [ϕ](π) and [ϕ](π/2), and a two-qubit gate, $$ZZ\left(\frac{\pi}{2}\right)$$

$$-\boxed{[\phi](\pi)}-, -\boxed{[\phi]\left(\frac{\pi}{2}\right)}-, -\boxed{ZZ\left(\frac{\pi}{2}\right)} \quad (4)$$

is used. While the single-qubit gates and the two-qubit gate in the standard TIQC gate set can readily be implemented on a TIQC, it is known in the art that this phase-insensitive TIQC gate set can be used to construct quantum circuits in a more robust fashion due to differences in physical realizations between this phase-insensitive TIQC gate set and the standard TIQC gate (e.g., geometries of laser beams used to implement single- and two-qubit gates).

Classical Gate Set

A classical gate set that may be used for the method of optimizing quantum circuits described herein includes a SWAP gate and a FLIP gate, as shown in FIG. 9A.

It should be noted that these classical gates, if needed, can always be implemented on a quantum computer directly. On a TIQC that provides a full qubit-to-qubit connectivity, a SWAP gate can always be replaced with appropriate re-indexing of qubits, which is a classical operation. Similarly, a FLIP gate is functionally equivalent to the quantum NOT gate and may be implemented as a classical operation whenever possible, for example, when the NOT gate is applied to a classical state of a qubit.

Representation

A quantum circuit is conventionally represented in one of the following two representations. The first is a netlist, in which a quantum circuit is stored as a list of quantum logic gates to be applied sequentially. The second is a directed acyclic graph (DAG) representation, in which vertices of the DAG represent quantum logic gates of the quantum circuits and edges of the DAG represent their input/output relationships. Conversions between the two representations are efficient and known in the art. It should be clear to those of ordinary skill in the art that different representations may be used to more efficiently implement different conversion and optimization steps discussed in detail below.

A quantum circuit constructed with the conventional gate set is converted to a quantum circuit constructed with the standard TIQC gate set and optimized in the following pre-processing, conversion, and optimizing process 700. It is assumed both the input and output circuits may have a circuit pre- or post-fix that are composed of the gates in the classical gate set only that can be treated entirely separately during the process 700. A quantum circuit constructed with the conventional gate set is first pre-processed such that two-qubit gate counts may be reduced in the subsequent conversion step in block 730 and the optimization subroutines 800.

IV. B Pre-Processing

In block 710, a quantum circuit constructed with the conventional gate set is received as an input. The number of qubits that the quantum circuit acts on is $N_q$ and the conventional gate set includes single-qubit gates, a NOT gate, a Hadamard gate H, and a phase shift gate $R_z(\theta)$, and a two-qubit gate, a CNOT gate.

In block 720, the received quantum circuit that is constructed with the conventional gate set is first pre-processed to better leverage the circuit conversion in the process 700 and the subsequent optimization subroutines 800 that are detailed below. The replacement rules, such as the rules shown in FIG. 9B may be applied, depending on whether such replacement admits better reduction of two-qubit gate counts the subsequent conversion step in block 730 and the optimization subroutines 800.

IV. C Conversion

An arbitrary single-qubit unitary U is parametrized as $$U = e^{i\gamma'}\begin{pmatrix} e^{-i\beta'}\cos(\theta/2) & ie^{i\alpha'}\sin(\theta/2) \\ ie^{-i\alpha'}\sin(\theta/2) & e^{i\beta'}\cos(\theta/2) \end{pmatrix}, \quad (6)$$

where α', β', γ', and θ are parameters to be adjusted. When implementing the single-qubit unitary U with the standard TIQC gate set, the above unitary U can be categorized into four different cases, where each case requires varying numbers of single-qubit gates in the TIQC gate set. The four cases are Case I, where no [ϕ] gate is required, Case II, where a single [ϕ](π) gate is required, Case III, where a single [ϕ](π/2a) gate is required, and Case IV, where two [ϕ](π/2) gates, with two different phase angles ϕ and ϕ' are required.

Case I: When a single-qubit unitary U is a diagonal matrix, a [ϕ] gate is not required, since, up to a global phase, this single-qubit unitary U can be expressed as either an identity or an $R_z$ gate. In case it is an identity gate up to a global phase, no action is required. In case it is an $R_z$ gate up to a global phase, the action of the $R_z$ gate can be absorbed as a part of the phase angles of the TIQC gate set. Thus, in Case I, the single-qubit unitary U to be implemented is $$U_I = e^{i\gamma'}\begin{pmatrix} e^{-i\beta'} & 0 \\ 0 & e^{i\beta'} \end{pmatrix}. \quad (7)$$

Case II: If a single-qubit unitary U is an off-diagonal matrix, only a single [ϕ](π) is required to implement the single-qubit unitary U. Thus, in Case II, the single-qubit unitary U to be implemented is $$U_{II} = e^{i\gamma'}\begin{pmatrix} 0 & ie^{i\alpha'} \\ ie^{-i\alpha'} & 0 \end{pmatrix}. \quad (8)$$

This matrix $U_{II}$ may be re-parametrized as $$U_{II} = ie^{i\gamma'}\begin{pmatrix} e^{i\phi/2} & 0 \\ 0 & e^{-i\phi/2} \end{pmatrix}\begin{pmatrix} 0 & 1 \\ 1 & 0 \end{pmatrix}\begin{pmatrix} e^{-i\phi/2} & 0 \\ 0 & e^{i\phi/2} \end{pmatrix}, \quad (9)$$

where the matrix multiplication part is equivalent to [ϕ](π).

Case III: When θ is an odd integer multiple of π/2 and β'=0, the single-qubit unitary U to be implemented is $$U_{III} = e^{i\gamma'}\begin{pmatrix} \frac{1}{\sqrt{2}} & i\frac{e^{i\alpha'}}{\sqrt{2}} \\ i\frac{e^{-i\alpha'}}{\sqrt{2}} & \frac{1}{\sqrt{2}} \end{pmatrix}. \quad (10)$$

This matrix $U_{111}$ may re-parametrized as $$U_m = \quad (11)$$

$$e^{i\gamma'}\begin{pmatrix} e^{i(\phi+\pi)/2} & 0 \\ 0 & e^{-i(\phi+\pi)/2} \end{pmatrix}\begin{pmatrix} \cos(\pi/4) & -i\sin(\pi/4) \\ -i\sin(\pi/4) & \cos(\pi/4) \end{pmatrix}\begin{pmatrix} e^{-i(\phi+\pi)/2} & 0 \\ 0 & e^{i(\phi+\pi)/2} \end{pmatrix},$$

where the matrix multiplication part is equivalent to [ϕ+π](π/2).

Case IV: In all other cases, two [ϕ](π/2) gates are required to implement single-qubit unitary U as $$U_{IV} = U = -\boxed{[\phi]\left(\frac{\pi}{2}\right)} - \boxed{[\phi']\left(\frac{\pi}{2}\right)} - \boxed{[R_z](\phi'')} -, \quad (12)$$

where $\phi = \theta - \pi + \phi'$, $\phi' = \alpha' + \beta' + 3\pi/2$, and $\phi'' = \theta + 2\beta'$.

The quantum circuit constructed with the conventional gate set is then converted to a quantum circuit constructed with the standard TIQC gate.

In block 730, the received quantum circuit constructed with the conventional gate set is converted into a quantum circuit constructed with the standard TIQC gate as an output.

First, an array of single-qubit unitaries with the size of $N_q$ is created and initialized to identities. Then, each gate that appears in the received quantum circuit is retrieved in the order of appearance. When the retrieved gate or a combination of gates commutes with a phase shift gate $R_z(\theta)$ (i.e., the order of the retrieved gate and the phase shift gate $R_z(\theta)$ can be reversed without affecting measurement results), $$\boxed{[R_z](\theta)} - \boxed{\text{Retrived Gate}} = \boxed{\text{Retrived Gate}} - \boxed{[R_z](\theta)},$$

the phase shift gate $R_z(\theta)$ may be placed after the retrieved gate. When the retrieved gate is a single-qubit gate that is a NOT gate, a Hadamard gate H, or a phase shift gate $R_z(\theta)$, on qubit index q, the matrix representation of the gate to the single-qubit unitary array at the qth position is simply multiplied. This effectively stores the single-qubit unitary U that needs to be applied to each qubit at any given time in the process of looping through all single-qubit gates in the received quantum circuit. When the retrieved gate is a two-qubit gate (i.e., a CNOT gate), the CNOT gate may be constructed with the standard TIQC gate set as shown in FIG. 9C, where v and s may be ±1, and v and s may be chosen so that the resulting output quantum circuit contains a small number of single-qubit gates. In the example of v=1 and s=1, a [π/2](π/2) gate may need to be accumulated on the control qubit, while the [−π](π/2) operation may be commuted through the [0][0](π/2) gate. Similarly, on the target qubit, the [−π](π/2) operation may be commuted through. Assuming a choice is made for both of the control qubit and the target qubit, Cases I-IV may simply be used to convert single-qubit gates on the two qubits, prior to the [0][0](π/2) gate. The concrete choice to either commute through or not can in principle be made to best reduce the number of single-qubit gates required in the converted quantum circuit based on Cases I-IV detailed above, with Case I being the most preferred to Case IV being the least preferred. Once the pre-[0][0](π/2) single qubit gates on both qubits and the [0][0](π/2) gate has been considered in the conversion process, the single-qubit unitary arrays on the control qubit and the target qubit is reset and re-initialized to identity. Depending on whether [−π](π/2) gate on each qubit has been commuted through or not, the matrix representation of the gate to the corresponding qubit index may or may not be multiplied, then the matrix representation of [3π/2](π/2) gate to the single-qubit unitary for the control qubit is multiplied.

Repeatedly applying the above procedure until no more gates are left in received quantum circuit constructed with the conventional gate set results in the converted quantum circuit constructed with the standard TIQC gate set, up to $R_z$ gates. To remove the explicit $R_z$ dependence, the following $R_z$ gate propagation rule as shown in FIG. 9D is considered. The propagated $R_z$ gates that may exist at the end of the converted quantum circuit can be dropped if the end of the circuit implies measurements in the qubit basis. If care is taken, this propagation process can straightforwardly be implemented in tandem with each single- or two-qubit gate conversion procedure described above. Irrespective of the implementation details, the complexity of the conversion process is $O(g)$, where g is the number of gates in the received quantum circuit constructed with the conventional gate set.

IV. D Optimizing Subroutines

Figure 8:
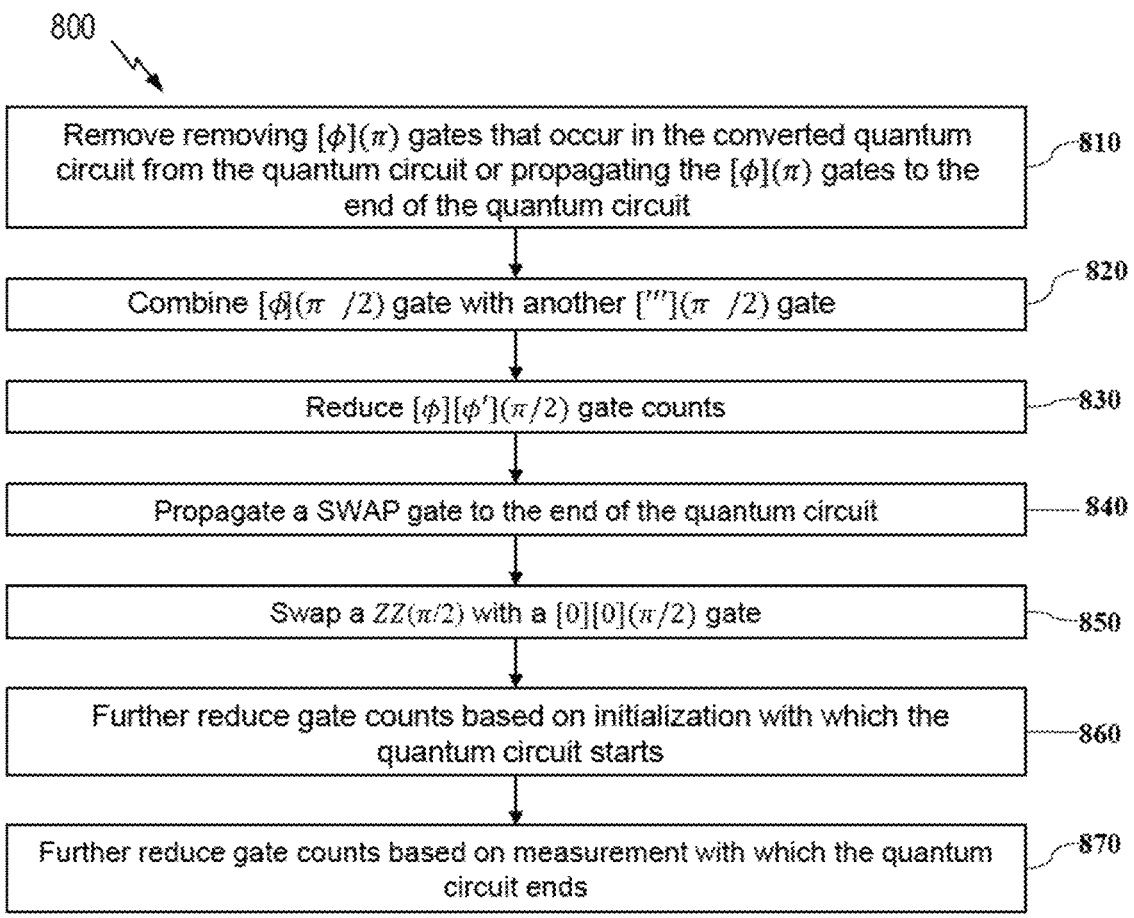
FIG. 8 illustrates a flow diagram of optimizing process that may be used to optimize a converted quantum circuit constructed with a standard TIQC gate set according to one embodiment.

In block 740, the converted quantum circuit constructed with the standard TIQC gate set is now optimized in the following subroutines 800 as shown in FIG. 8.

In block 810 (Subroutine: [φ](π) propagation), all of the [φ](π) gates that occur in the converted quantum circuit constructed with the standard TIQC gate set can either be removed from the quantum circuit or be propagated to the end of the quantum circuit. In particular, the rule shown in FIG. 9E, where $R_2$ gates are re-introduced. Thus, it is convenient to include an additional rule, shown in FIG. 9F.

By repeatedly applying the above rules, [φ](π) gates can be eliminated from the quantum circuit, with the possible exception of [φ](π) gates at the very end of the quantum circuit.

In some embodiments, these auxiliary $R_z$ gates may be cleaned up by a cleanup subroutine, once the propagation process is complete. Hereafter, this final $R_z$ cleanup process is included as a part of the [φ](π) propagation subroutine. The output circuit of this subroutine is constructed with the standard TIQC gate set. The complexity of this subroutine is $O(g)$.

In block 820 (Subroutine: [φ](π/2) merge), for the [φ](π/2) gates, a two-pronged approach is taken, where first it is determined if a [φ](π/2) gate can either be combined with another [φ'](π/2) gate to form a more optimization-friendly gate or be propagated through another gate. Then, if it is not possible to identify the combination or propagation opportunity for a given [φ](π/2), the propagation that was considered for the [φ](π/2) gate optimization is reverted. Otherwise the propagation is continued until a combination opportunity is found.

The combination circuits are shown in FIG. 9G. The propagation circuits are shown in FIG. 9H, where $R_z$ gates is included. Thus, it is convenient to include an additional rule, i.e., shown in FIG. 9I. The $R_z$-cleanup subroutine is used right after the above rules have been applied to optimize the [φ](π/2) gate counts. Hereafter, the [φ](π/2) merge includes this cleanup operation. The output circuit of this subroutine is constructed with the standard TIQC gate set. The complexity of this subroutine is $O(g^2)$. The complexity may be reduced to $O(g)$ by setting a maximum propagation length.

In block 830 (Subroutine: [φ][φ'](π/2) merge), [φ][φ'](π/2) gate counts are reduced. In this subroutine, an input quantum circuit is an output of the previous subroutine and constructed with the standard TIQC gate set. An output circuit is constructed with the extended TIQC gate set. As in the previous subroutine, a two-pronged approach is used as well.

Figure 9K:
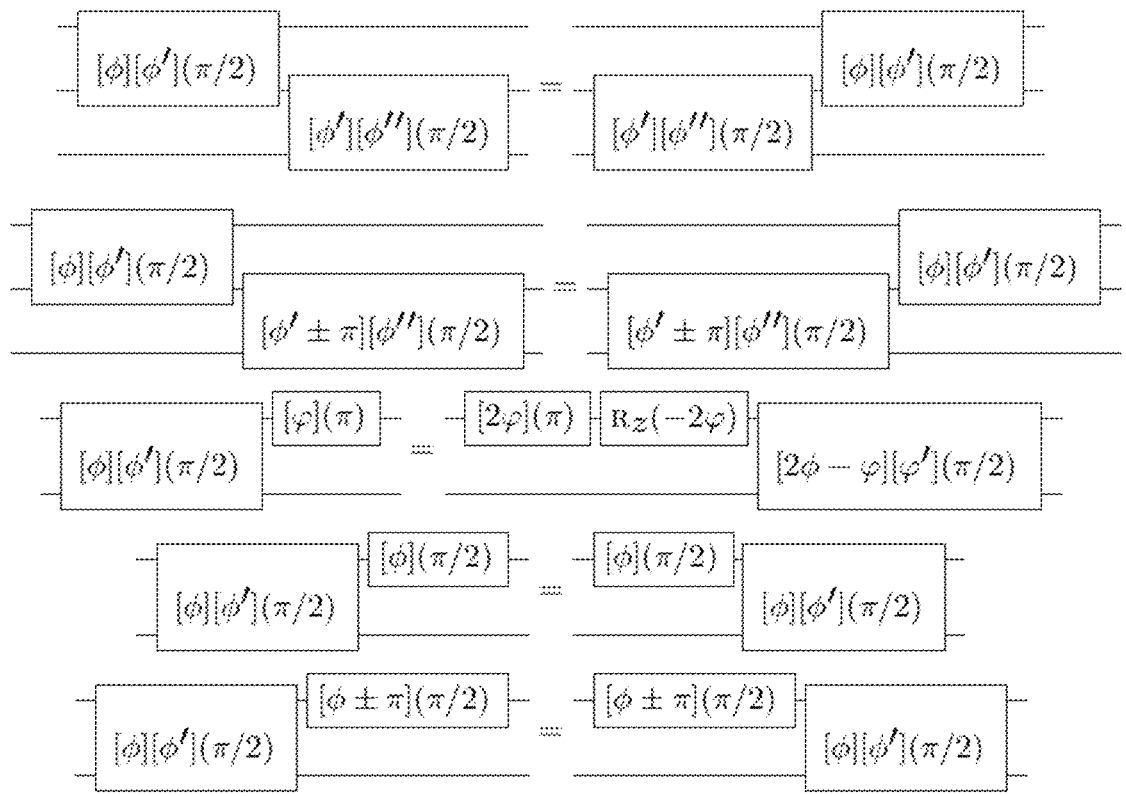

The combination circuits are shown in FIG. 9J. The propagation rules are shown in FIG. 9K. The optimization strategy is the same as in the previous subroutine. That is, first a [φ][φ'](π/2) gate is optimized, propagated through using the propagation rules above, until either no more propagation can be applied or a combination rule applies. Should the propagation rule no longer apply or no combination rule is found applicable, the circuit is restored to its original state by de-propagating the gate. Once every [φ][φ'](π/2) gate has been considered, the $R_z$ gates are cleaned up using the propagation rule described above. It should be noted that the extended TIQC gate set used in this routine includes a SWAP gate. The $R_z$ gate propagation takes the effect of SWAP gates into account by traversing along appropriate qubits in accordance with any SWAPoperations. The complexity of this subroutine is $O(g^2)$, which may be reduced to $O(g)$ by considering a maximum propagation length.

Figure 9L:
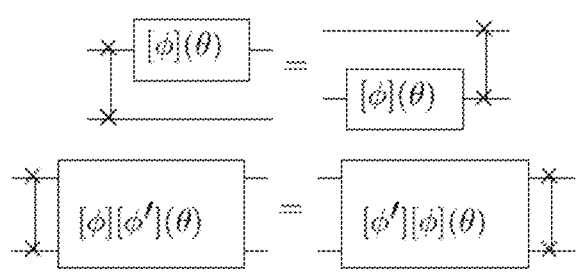

In block 840 (Subroutine: Swap unwind), the output quantum circuit of the previous subroutine constructed with the extended TIQC gate set is re-written with the standard TIQC gate set. In this subroutine, the SWAP gate included in the extended TIQC gate set is addressed. It should be noted that in a trapped-ion architecture a full qubit connectivity is often provided. In this case, there is no need to implement a quantum SWAP gate. The qubit indices may be simply updated posterior to a SWAP operation appropriately, according to FIG. 9L, where θ may be any angle of rotation. Repeatedly applying the rules above can propagate all occurrences of SWAP gates to the end of the quantum circuit. In practice, the qubit permutation formed by the transpositions implied by the SWAP gates may be simply kept and the permutation of qubits may be applied to each gate. The permutation is initialized to a fixed point for each qubit at the beginning of the quantum circuit and is applied to each subsequent quantum gate. The permutation is updated whenever a SWAP gate is encountered. The permutation of the qubit indices is stored once the end of the circuit is reached.

The complexity of this subroutine is $O(g)$, since all that is required is to pass through the quantum circuit once.

Figure 9M:
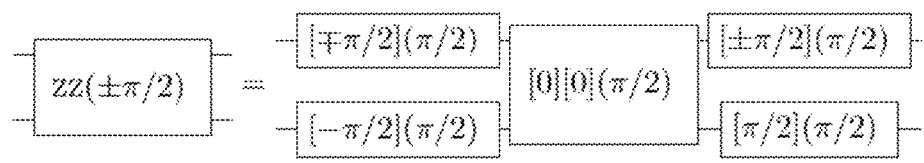

In block 850 (Subroutine: ZZ(±π/2) to [0][0](π/2) basis change), the ZZ(π/2) gate is pre-swapped once the SWAP gates are propagated through the entire circuit from the previous subroutine. In this subroutine, every ZZ(π/2) gate in the circuit is simply re-written as FIG. 9M. The complexity of this subroutine is $O(g)$.

Figure 9N:
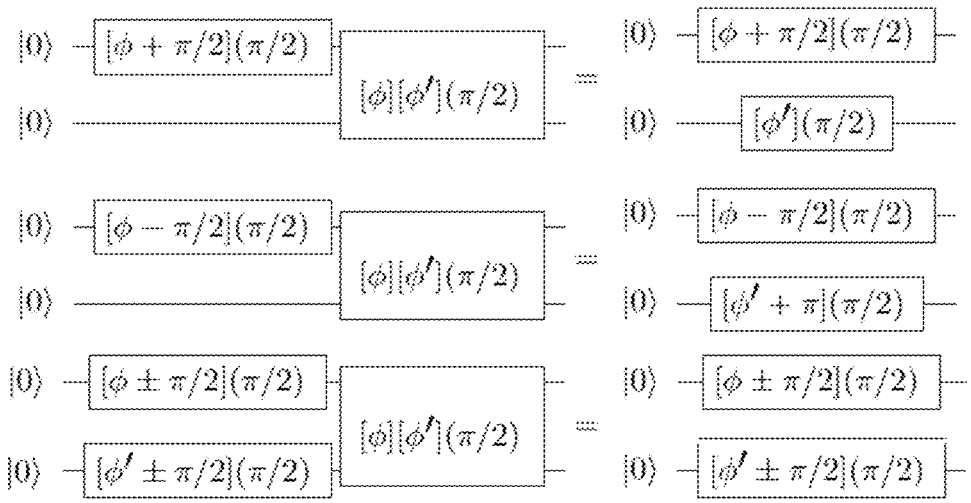

In block 860 (Subroutine: Initial zero), the gate counts are further reduced based on the consideration that every gate in the quantum circuit may start with initialization (i.e., starting with a well-defined quantum state, such as an all zero, classical state) and end with measurement. In this case, often times it is possible to further reduce the gate counts by considering the circuit identities as shown in FIG. 9N. The complexity of this subroutine is $O(g)$.

Figure 9O:
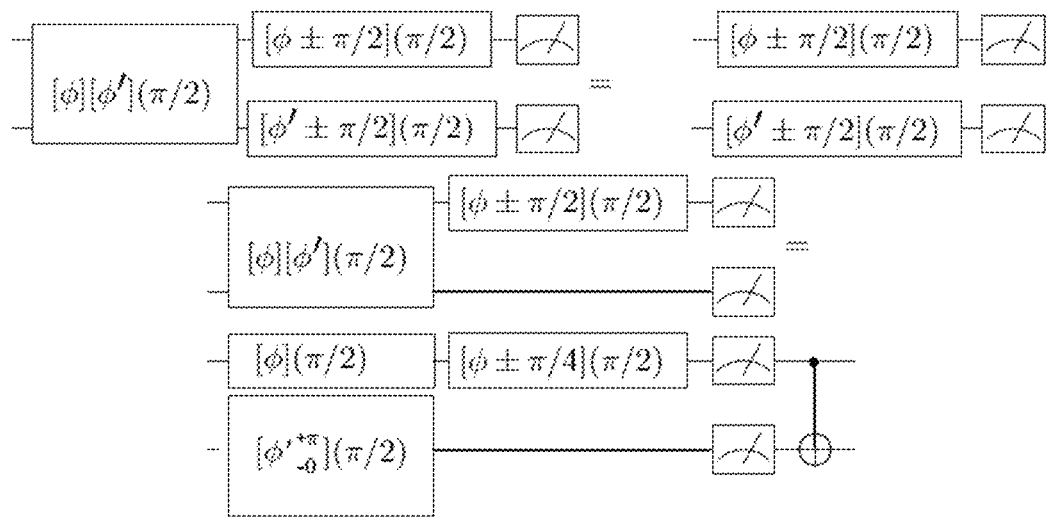

In block 870 (Subroutine: Final measurement), the gate counts are further reduced based on the consideration that every gate in the quantum circuit may end with measurement of the qubits in their computational basis. That is, whenever there is a diagonal operation prior to the measurement, it is not necessary to apply the operation since the measurement outcome is not affected. In the standard TIQC gate set, the following circuit identities are useful in this context as shown in FIG. 9O. The complexity of this subroutine is $O(g)$.

It should be noted that the subroutines in blocks 810 and 840 propagate [φ](π) and SWAP gates, respectively, towards the terminal end of the quantum circuit. If it is assumed that the quantum circuit is always followed by measurement operations over all qubits, these operations can be applied classically. Specifically, a [φ](π) gate followed by a measurement is equivalent to the measurement followed by a FLIP gate.

IV. D Phase Insensitive Conversion

Figure 9P:
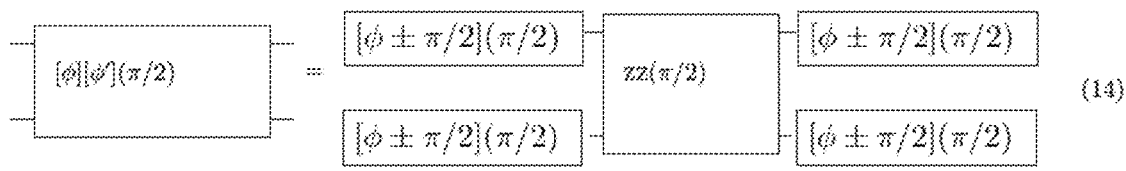

In block 750, the quantum circuit constructed with the standard TIQC gate set is converted to a quantum circuit constructed the phase-insensitive TIQC gate set. The only difference between the standard TIQC gate set and the phase-insensitive TIQC gate set is the two-qubit gate. In the standard TIQC set, a [φ][φ'] gate is used to entangle a pair of qubits. In the phase-insensitive TIQC set, a ZZ gate is used to entangle a pair of qubits. To thus convert the quantum circuit constructed with the standard TIQC gate set to one constructed with the phase-insensitive TIQC gate set, the following circuit identity as shown in FIG. 9P is used. Applying the shown identity for every occurrence of [φ][φ'] gates in an input quantum circuit constructed the standard TIQC gate set results in an output quantum circuit constructed with the phase-insensitive TIQC gate set. The complexity of this routine is O(g).

In block 760, the converted quantum circuit constructed with the phase-insensitive TIQC gate set is optimized. In some embodiments, single-qubit gate optimization routines known in the art may be applied to remove single-qubit gate inefficiency that may have been introduced in the conversion process, after the two-qubit gate conversion process.

It should be noted that the phase-insensitive TIQC gate set based on the ZZ-gate is less nimble than the standard TIQC gate set based on the [φ][φ'] gate in that a ZZ gate has no free parameter, whereas the [φ][φ'] gate has two real degrees of freedom that can be used to encode additional quantum information. It is thus expected quantum circuits constructed with the phase-insensitive TIQC gate set have at least as many gates as the standard TIQC gate set counterpart. The advantages offered by the phase-insensitive TIQC gate set, such as higher fidelity and improved robustness of quantum gates against phase drift, need to be carefully weighed against the potentially increased number of gate operations.

While the foregoing is directed to specific embodiments, other and further embodiments may be devised without departing from the basic scope thereof, and the scope thereof is determined by the claims that follow.

The invention claimed is:

1. A method of performing a computation using a quantum computer, comprising:
   converting, by a classical computer, a first quantum circuit to a second quantum circuit, wherein the first quantum circuit comprises a conventional gate set and the second quantum circuit comprises a standard trapped-ion gate set;
   generating a first optimized quantum circuit, which comprises the standard trapped-ion gate set, by adjusting the second quantum circuit, by use of the classical computer;
   converting, by the classical computer, the first optimized quantum circuit to a third quantum circuit comprising a phase-insensitive trapped-ion gate set;
   generating a second optimized quantum circuit comprising the phase-insensitive trapped-ion gate set, by adjusting the third quantum circuit, by use of the classical computer; and
   applying the first or the second optimized quantum circuit on a quantum computer to perform a computation.

2. The method of claim 1, further comprising:
   pre-processing the first quantum circuit, prior to the converting the first quantum circuit.

3. The method of claim 1, wherein the adjusting of the second quantum circuit comprises:
   removing [φ](π) gates that occur in the second quantum circuit or propagating the [φ](π) gates to the end of the second quantum circuit.

4. The method of claim 1, wherein the adjusting of the second quantum circuit comprises:
   combining a [φ](π/2) gate with another [φ'](π/2) gate.

5. The method of claim 1, wherein the adjusting of the second quantum circuit comprises:
   reducing [φ][φ'](π/2) gate counts.

6. The method of claim 1, wherein the adjusting of the second quantum circuit comprises:
   propagating a SWAP gate to the end of the second quantum circuit.

7. The method of claim 1, wherein the adjusting of the second quantum circuit comprises:
   swapping a ZZ(π/2) gate with a [0][0](π/2) gate.

8. The method of claim 1, wherein the adjusting of the second quantum circuit set comprises:
   further reducing gate counts based on initialization with which the second quantum circuit starts.

9. The method of claim 1, wherein the adjusting of the second quantum circuit comprises:
   further reducing gate counts based on measurement with which the second quantum circuit ends.

10. An ion trap quantum computing system, comprising:
    a quantum processor comprising a plurality of qubits, each qubit comprising a trapped ion having two hyperfine states;
    one or more lasers configured to emit a first Raman laser beam and a second Raman laser beam, which is provided to trapped ions in the quantum processor;
    a classical computer configured to perform operations comprising:
      converting a first quantum circuit to a second quantum circuit, wherein the first quantum circuit comprises a conventional gate set and the second quantum circuit comprises a standard trapped-ion gate set;
      generating a first optimized quantum circuit, which comprises the standard trapped-ion gate set, by adjusting the second quantum circuit;
      converting the first optimized quantum circuit to a third quantum circuit comprising a phase-insensitive trapped-ion gate set; and
      generating a second optimized quantum circuit comprising the phase-insensitive trapped-ion gate set, by adjusting the third quantum circuit; and
    a system controller configured to execute a control program to control the one or more lasers to perform operations on the quantum processor, the operations comprising:
      applying the first or the second optimized quantum circuit on the quantum processor to perform a computation; and
      measuring population of qubit states in the quantum processor,
    wherein the classical computer is further configured to output the measured population of qubit states in the quantum processor.

11. The ion trap quantum computing system of claim 10, wherein the operations further comprises:
   pre-processing the first quantum circuit, prior to the converting the first quantum circuit.

12. The ion trap quantum computing system of claim 10, wherein the adjusting of the second quantum circuit comprises:
   removing $[\phi](\pi)$ gates that occur in the second quantum circuit or propagating the $[\phi](\pi)$ gates to the end of the second quantum circuit;
   combining a $[\phi](\pi/2)$ gate with another $[\phi'](\pi/2)$ gate;
   reducing $[\phi][\phi'](\pi/2)$ gate counts; and
   propagating a SWAP gate to the end of the second quantum circuit.

13. The ion trap quantum computing system of claim 10, wherein the adjusting of the second quantum circuit comprises:
   swapping a $ZZ(\pi/2)$ gate with a $[0][0](\pi/2)$ gate.

14. The ion trap quantum computing system of claim 10, wherein the adjusting of the second quantum circuit comprises:
   further reducing gate counts based on initialization with which the second quantum circuit starts.

15. The ion trap quantum computing system of claim 10, wherein the adjusting of the second quantum circuit comprises:
   further reducing gate counts based on measurement with which the second second quantum circuit ends.

16. An ion trap quantum computing system, comprising:
   a classical computer;
   a quantum processor comprising a plurality of qubits, each qubit comprising a trapped ion having two hyperfine states;
   a system controller configured to execute a control program to control one or more lasers to perform operations on the quantum processor; and
   non-volatile memory having a number of instructions stored therein which, when executed by one or more processors, causes the ion trap quantum computing system to perform operations comprising:
      converting, by the classical computer, a first quantum circuit to a second quantum circuit, wherein the first quantum circuit comprises a conventional gate set and the second quantum circuit comprises a standard trapped-ion gate set;
      generating a first optimized quantum circuit, which comprises the standard trapped-ion gate set, by adjusting the second quantum circuit, by use of the classical computer;
      converting, by the classical computer, the first optimized quantum circuit to a third quantum circuit comprising a phase-insensitive trapped-ion gate set;
      generating a second optimized quantum circuit comprising the phase-insensitive trapped-ion gate set, by adjusting the third quantum circuit, by use of the classical computer; and
      applying, by the system controller, the first or the second optimized quantum circuit on a quantum computer to perform a computation;
      measuring, by the system controller, population of qubit states in the quantum processor; and
      outputting, by the classical computer, the measured population of qubit states in the quantum processor.

17. The ion trap quantum computing system of claim 16, further comprising:
   pre-processing the first quantum circuit, prior to the converting the first quantum circuit.

18. The ion trap quantum computing system of claim 16, wherein the adjusting of the second quantum circuit comprises:
   removing $[\phi](\pi)$ gates that occur in the second quantum circuit or propagating the $[\phi](\pi)$ gates to the end of the second quantum circuit;
   combining a $[\phi](\pi/2)$ gate with another $[\phi'](\pi/2)$ gate;
   reducing $[\phi][\phi'](\pi/2)$ gate counts;
   propagating a SWAP gate to the end of the second quantum circuit; and
   swapping a $ZZ(\pi/2)$ gate with a $[0][0](\pi/2)$ gate.

19. The ion trap quantum computing system of claim 16, wherein the adjusting of the second quantum circuit comprises:
   further reducing gate counts based on initialization with which the second quantum circuit starts.

20. The ion trap quantum computing system of claim 16, wherein the adjusting of the second quantum circuit comprises:
   further reducing gate counts based on measurement with which the second quantum circuit ends.

* * * * *